US007257634B2

(12) United States Patent
Colby et al.

(10) Patent No.: US 7,257,634 B2
(45) Date of Patent: *Aug. 14, 2007

(54) METHOD AND APPARATUS FOR DIRECTING A FLOW OF PACKETS BASED ON REQUEST AND SERVER ATTRIBUTES

(75) Inventors: Steven Colby, Billerica, MA (US); John J. Krawczyk, Arlington, MA (US); Raj Krishnan Nair, Acton, MA (US); Katherine Royce, Manchester, NH (US); Kenneth P. Siegel, Nashua, NH (US); Richard C. Stevens, Littleton, MA (US); Scott Wasson, Shrewsbury, MA (US)

(73) Assignee: Cisco Technology, Inc., San Jose, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 11/056,031

(22) Filed: Feb. 11, 2005

(65) Prior Publication Data

US 2005/0193114 A1    Sep. 1, 2005

Related U.S. Application Data

(63) Continuation of application No. 10/197,339, filed on Jul. 17, 2002, now Pat. No. 6,862,624, which is a continuation of application No. 09/400,635, filed on Sep. 21, 1999, now Pat. No. 6,449,647, which is a continuation of application No. 09/050,524, filed on Mar. 30, 1998, now Pat. No. 6,006,264.

(60) Provisional application No. 60/054,687, filed on Aug. 1, 1997.

(51) Int. Cl.
*G06F 15/173* (2006.01)
*G06F 15/177* (2006.01)

(52) U.S. Cl. ..................... 709/226; 709/240
(58) Field of Classification Search ............... 709/226, 709/220, 240
See application file for complete search history.

(56) References Cited

U.S. PATENT DOCUMENTS 6,006,264 A * 12/1999 Colby et al. ............... 709/226
6,449,647 B1 * 9/2002 Colby et al. ............... 709/226
6,862,624 B2 * 3/2005 Colby et al. ............... 709/226

* cited by examiner

*Primary Examiner*—Larry D. Donaghue
(74) *Attorney, Agent, or Firm*—Chapin IP Law, LLC; Barry W. Chapin, Esq.

(57) ABSTRACT

A content-aware flow switch intercepts a client content request in an IP network, and transparently directs the content request to a best-fit server. The best-fit server is chosen based on the type of content requested, the quality of service requirements implied by the content request, the degree of load on available servers, network congestion information, and the proximity of the client to available servers. The flow switch detects client-server flows based on the arrival of TCP SYNs and/or HTTP GETs from the client. The flow switch implicitly deduces the quality of service requirements of a flow based on the content of the flow. The flow switch also provides the functionality of multiple physical web servers on a single web server in a way that is transparent to the client, through the use of virtual web hosts and flow pipes.

20 Claims, 26 Drawing Sheets

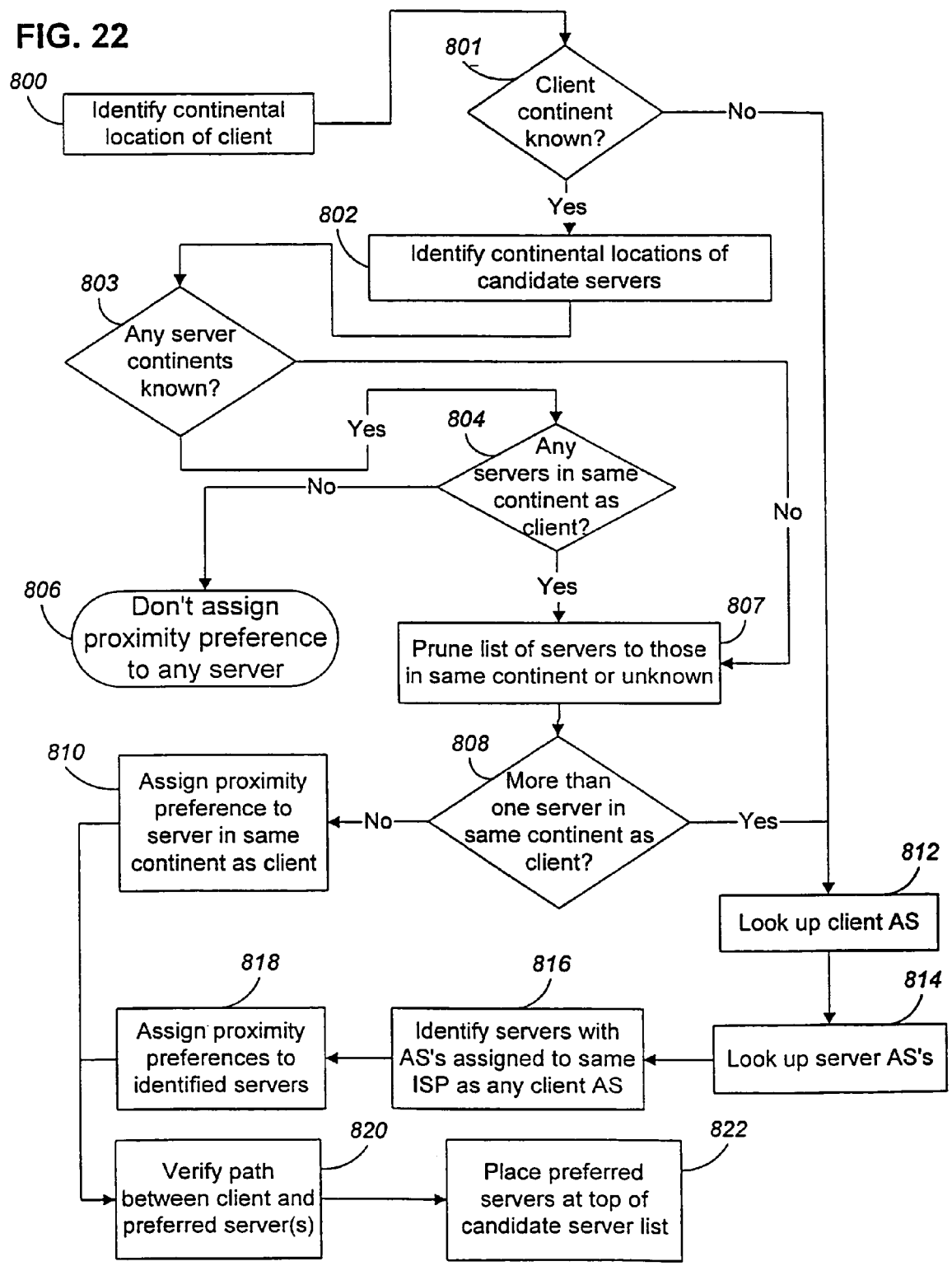

METHOD AND APPARATUS FOR DIRECTING A FLOW OF PACKETS BASED ON REQUEST AND SERVER ATTRIBUTES

REFERENCES TO RELATED APPLICATIONS

This application is a Continuation of U.S. application Ser. No. 10/197,339, filed Jul. 17, 2002, now issued U.S. Pat. No. 6,862,624, which a continuation of U.S. patent application Ser. No. 09/400,635, filed Sep. 21, 1999, now issued U.S. Pat. No. 6,449,647, which is a Continuation of U.S. application Ser. No. 09/050,524, filed Mar. 30, 1998, now issued U.S. Pat. No. 6,006,264, which claims priority from a U.S. Provisional Application Ser. No. 60/054,687, Filed Aug. 1, 1997, which is hereby incorporated by reference.

BACKGROUND OF THE INVENTION

The present invention relates to content-based flow switching in Internet Protocol (IP) networks.

IP networks route packets based on network address information that is embedded in the headers of packets. In the most general sense, the architecture of a typical data switch consists of four primary components: (1) a number of physical network ports (both ingress ports and egress ports), (2) a data plane, (3) a control plane, and (4) a management plane. The data plane, sometimes referred to as the "fastpath," is responsible for moving packets from ingress ports of the data switch to egress ports of the data switch based on addressing information contained in the packet headers and information from the data switch's forwarding table. The forwarding table contains a mapping between all the network addresses the data switch has previously seen and the physical port on which packets destined for that address should be sent. Packets that have not previously been mapped to a physical port are directed to the control plane. The control plane determines the physical port to which the packet should be forwarded. The control plane is also responsible for updating the forwarding table so that future packets to the same destination may be forwarded directly by the data plane. The data plane functionality is commonly performed in hardware. The management plane performs administrative functions such as providing a user interface (UI) and managing Simple Network Management Protocol (SNMP) engines.

Packets conforming to the TCP/IP Internet layering model have 5 layers of headers containing network address information, arranged in increasing order of abstraction. A data switch is categorized as a layer N switch if it makes switching decisions based on address information in the $N^{th}$ layer of a packet header. For example, both Local Area Network (LAN, layer 2) switching and IP (layer 3) switching switch packets based solely on address information contained in transmitted packet headers. In the case of LAN switching, the destination MAC address is used for switching, and in the case of IP switching, the destination IP address is used for switching.

Applications that communicate over the Internet typically communicate with each other over a transport layer (layer 4) Transmission Control Protocol (TCP) or User Datagram Protocol (UDP) connection. Such applications need not be aware of the switching that occurs at lower levels (levels 1–3) to support the layer 4 connection. For example, an HyperText Transfer Protocol (HTTP) client (also known as a web browser) exchanges HTTP (layer 5) control messages and data (payload) with a target web server over a TCP (layer 4) connection.

"Content" can be loosely defined as any information that a client application is interested in receiving. In an IP network, this information is typically delivered by an application-layer server application using TCP or UDP as its transport layer. The content itself may be, for example, a simple ASCII text file, a binary file, an HTML page, a Java applet, or real-time audio or video.

A "flow" is a series of frames exchanged between two connection endpoints defined by a layer 3 network address and a layer 4 port number pair for each end of the connection. Typically, a flow is initiated by a request at one of the two connection endpoints for content which is accessible through the other connection endpoint. The flow that is created in response to the request consists of (1) packets containing the requested content, and (2) control messages exchanged between the two endpoints.

Flow classification techniques are used to associate priority codes with flows based on their Quality of Service (QoS) requirements. Such techniques prioritize network requests by treating flows with different QoS classes differently when the flows compete for limited network resources. Flows in the same QoS class are assigned the same priority code. A flow classification technique may, for example, classify flows based on IP addresses and other inner protocol header fields. For example, a QoS class with a particular priority may consist of all flows that are destined for destination IP address 142.192.7.7 and TCP port number 80 and TOS of 1 (Type of Service field in the IP header). This technique can be used to improve QoS by giving higher priority flows better treatment.

Internet Service Providers (ISPs) and other Internet Content Providers commonly maintain web sites for their customers. This service is called web hosting. Each web site is associated with a web host. A web host may be a physical web server. A web host may also be a logical entity, referred to as a virtual web host (VWH). A virtual web host associated with a large web site may span multiple physical web servers. Conversely, several virtual web hosts associated with small web sites may share a single physical web server. In either case, each virtual web host provides the functionality of a single physical web server in a way that is transparent to the client. The web sites hosted on a virtual web host share server resources, such as CPU cycles and memory, but are provided with all of the services of a dedicated web server. A virtual web host has one or more public virtual IP address that clients use to access content on the virtual web host. A web host is uniquely identified by its public IP address. When a content request is made to the virtual web host's virtual IP address, the virtual IP address is mapped to a private IP address, which points either to a physical server or to a software application identified by both a private IP address and a layer 4 port number that is allocated to the application.

SUMMARY OF THE INVENTION

In one aspect, the invention features content-aware flow switching in an IP network. Specifically, when a client in an IP network makes a content request, the request is intercepted by a content-aware flow switch, which seamlessly forwards the content request to a server that is well-suited to serve the content request. The server is chosen by the flow switch based on the type of content requested, the QoS requirements implied by the content request, the degree of load on available servers, network congestion information, and the proximity of the client to available servers. The entire process of server selection is transparent to the client.

In another aspect, the invention features implicit deduction of the QoS requirements of a flow based on the content of the flow request. After a flow is detected, a QoS category is associated with the flow, and buffer and bandwidth resources consistent with the QoS category of the flow are allocated. Implicit deduction of the QoS requirements of incoming flow requests allows network applications to significantly improve their Quality of Service (QoS) behavior by (1) preventing over-allocation of system resources, and (2) enforcing fair competition among flows for limited system resources based on their QoS classes by using a strict priority and weighted fair queuing algorithm.

In another aspect, the invention features flow pipes, which are logical pipes through which all flows between virtual web hosts and clients travel. A single content-aware flow switch can support multiple flow pipes. A configurable percentage of the bandwidth of a content-aware flow switch is reserved for each flow pipe.

In another aspect, the invention features a method for selecting a best-fit server, from among a plurality of servers, to service a client request for content in an IP network. A location of the client is identified. A location of each of the plurality of servers is identified. Servers that are in the same location as the client are identified. A server from among the plurality of servers is selected as the best-fit server, using a method which assigns a proximity preference to the identified servers. The location of the client may be a continent in which the client resides. The location of each of the plurality of servers may be a continent in which the server resides. Servers that are in the same location as the client may be identified by identifying administrative authorities associated with the client based on its IP address, identifying, for each of the plurality of servers, administrative authorities associated with the server, and identifying servers associated with an administrative authority that is associated with the client. The administrative authorities may be Internet Service Providers.

One advantage of the invention is that content-aware flow switches can be interconnected and overlaid on top of an IP network to provide content-aware flow switching regardless of the underlying technology used by the IP network. In this way, the invention provides content-aware flow switching without requiring modifications to the core of existing IP networks.

Another advantage of the invention is that by using content-aware flow switching, a server farm may gracefully absorb a content request spike beyond the capacity of the farm by directing content requests to other servers. This allows mirroring of critical content in distributed data centers, with overflow content delivery capacity and backup in the case of a partial communications failure. Content-aware flow switches also allow individual web servers to be transparently removed for service.

Another advantage of the invention is that it performs admission control on a per flow basis, based on the level of local network congestion, the system resources available on the content-aware flow switch, and the resources available on the web servers front-ended by the flow switch. This allows resources to be allocated in accordance with individual flow QoS requirements.

One advantage of flow pipes is that the virtual web host associated with a flow pipe is guaranteed a certain percentage of the total bandwidth available to the flow switch, regardless of the other activity in the flow switch. Another advantage of flow pipes is that the quality of service provided to the flows in a flow pipe is tailored to the QoS requirements implied by the content of the individual flows.

Another advantage of the invention is that, when performing server selection, a server in the same continent as the client is preferred over servers in another continent. Trans-continental network links introduce delay and are frequently congested. The server selection process tends to avoid such trans-continental links and the bottlenecks they introduce.

Another advantage of the invention is that, when performing server selection, a server that shares a "closest" backbone ISP with the client is preferred. Backbone ISPs connect with one another at Network Access Points (NAP). NAPs frequently experience congestion. By selecting a path between a client and a server that does not include a NAP, bottlenecks are avoided.

Other features and advantages of the invention will become apparent from the following description and from the claims.

BRIEF DESCRIPTION OF THE DRAWINGS

FIG. 22 is a flow chart of a method for ordering servers in a list of candidate servers based on proximity.

DETAILED DESCRIPTION

Figure 1A:
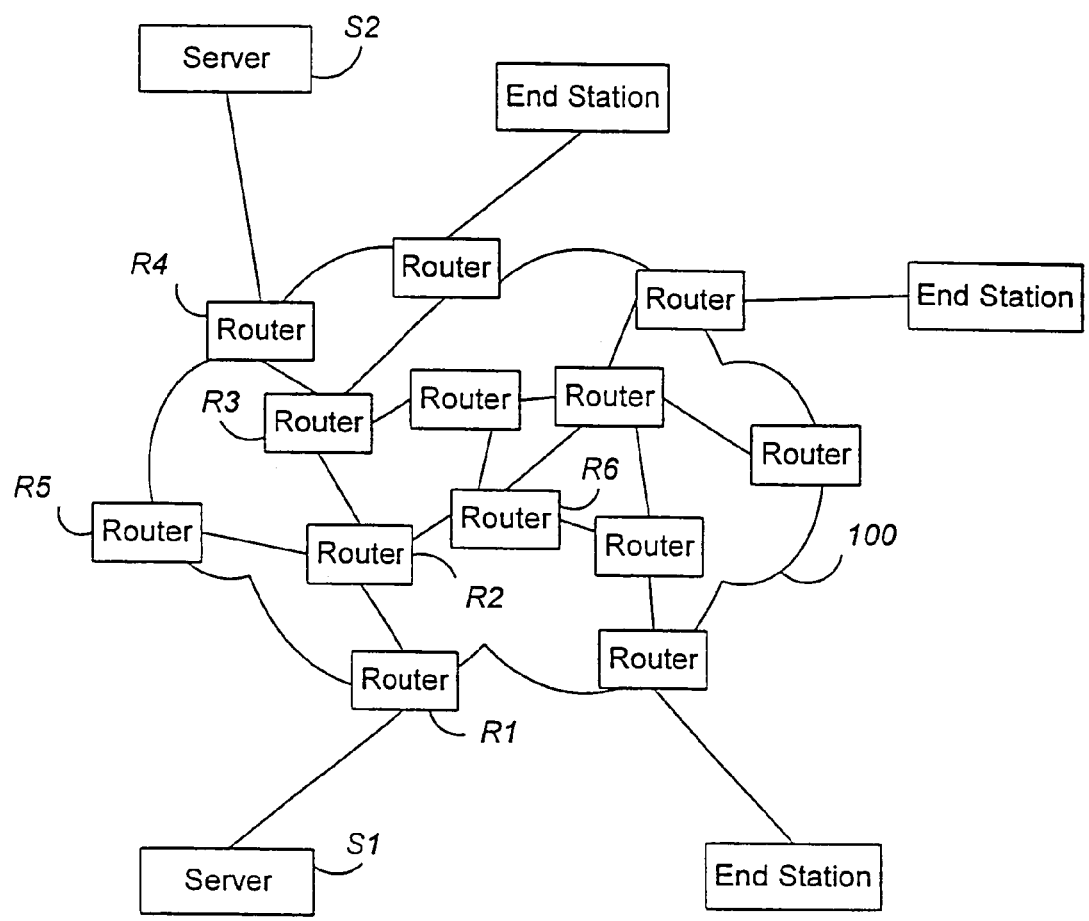
FIG. 1a is a block diagram of an IP network.

Referring to FIG. 1a, in a conventional IP network 100, such as the Internet, servers are connected to routers at the edges of the network 100. Each router is connected to one or more other routers. Each stream of information transmitted from one end station to another is broken into packets containing, among other things, a destination address indicating the end station to which the packet should be delivered. A packet is transmitted from one end station to another via a sequence of routers. For example, a packet may originate at server S1, traverse routers R1, R2, R3, and R4, and then be delivered to server S2.

In FIG. 1a, a network node is either a router or an end station. Each router has access to information about each of the nodes to which the router is connected. When a router receives a packet, the router examines the packet's destination address, and forwards the packet to a node that the router calculates to be most likely to bring the packet closer to its destination address. The process of choosing an intermediary destination for a packet and forwarding the packet to the intermediary destination is called routing.

For example, referring to FIG. 1a, server S1 transmits a packet, whose destination address is server S2, to router R1. Router R1 is only connected to server S1 and to router R2. Router R1 therefore forwards the packet to router R2. When the packet reaches router R2, router R2 must choose to forward the packet to one of routers R1, R5, R3, and R6 based on the packet's destination IP address. The packet is passed from router to router until it reaches its destination of server S2.

Figure 1B:
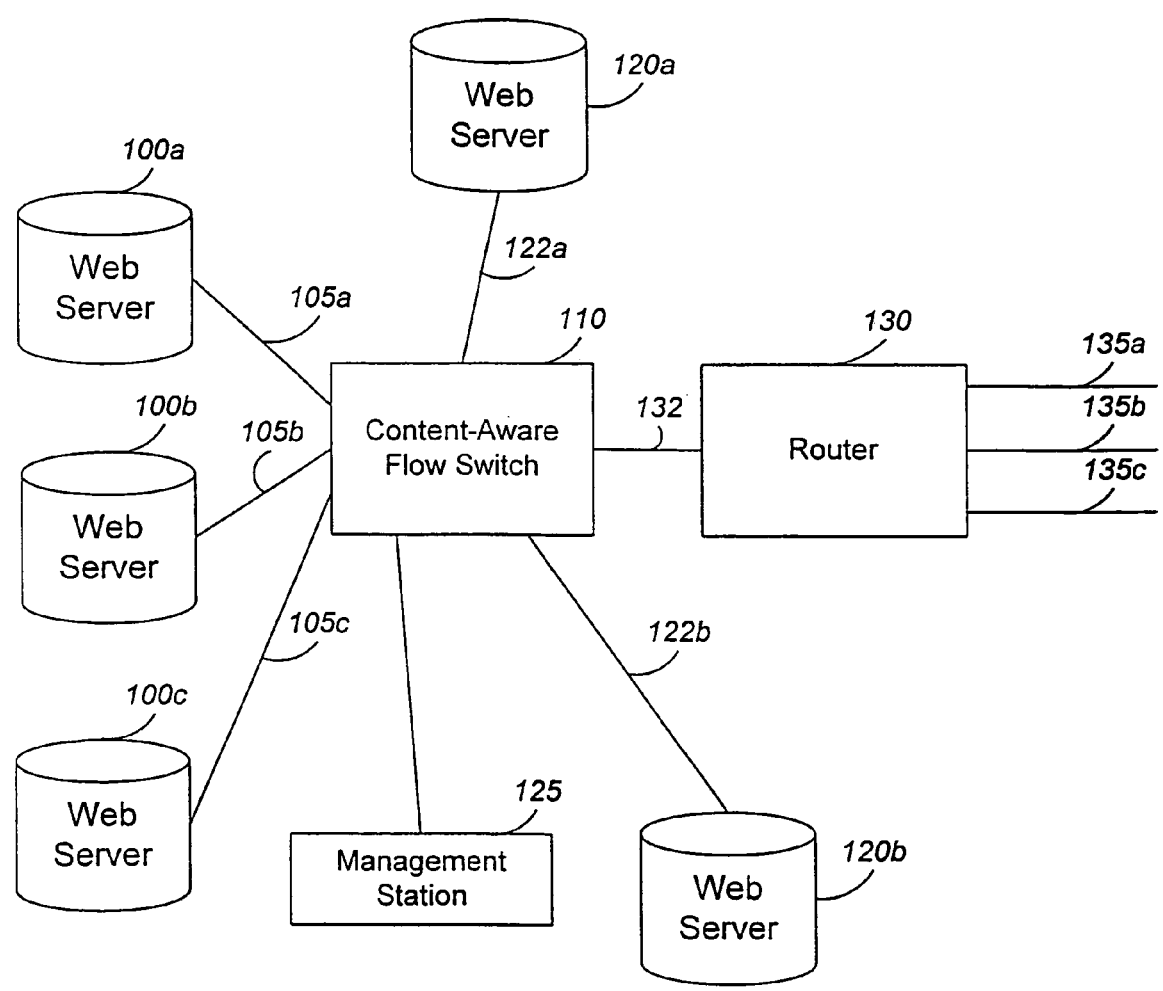
FIG. 1b is a block diagram of a segment of a network employing a content-aware flow switch.

Referring to FIG. 1b, web servers 100a–c and 120a–b are connected to a content-aware flow switch 110. The web servers 100a–c are connected to the flow switch 110 over LAN links 105a–c. The web servers 120a–b are connected to the flow switch 110 over WAN links 122a–b. The flow switch 110 may be configured and its health monitored using a network management station 125. The role of the management station 125 is to control and manage one or more communications devices from an external device such as a workstation running network management applications. The network management station 125 communicates with network devices via a network management protocol such as the Simple Network Management Protocol (SNMP). The flow switch 110 may connect to the network 100 (FIG. 1a) through a router 130. The flow switch 110 is connected to the router 130 by a LAN or WAN link 132. Alternatively, the flow switch 110 may connect to the network 100 directly via one or more WAN links (not shown). The router 130 connects to an Internet Service Provider (ISP) (not shown) by multiple WAN links 135a–c.

Figure 1C:
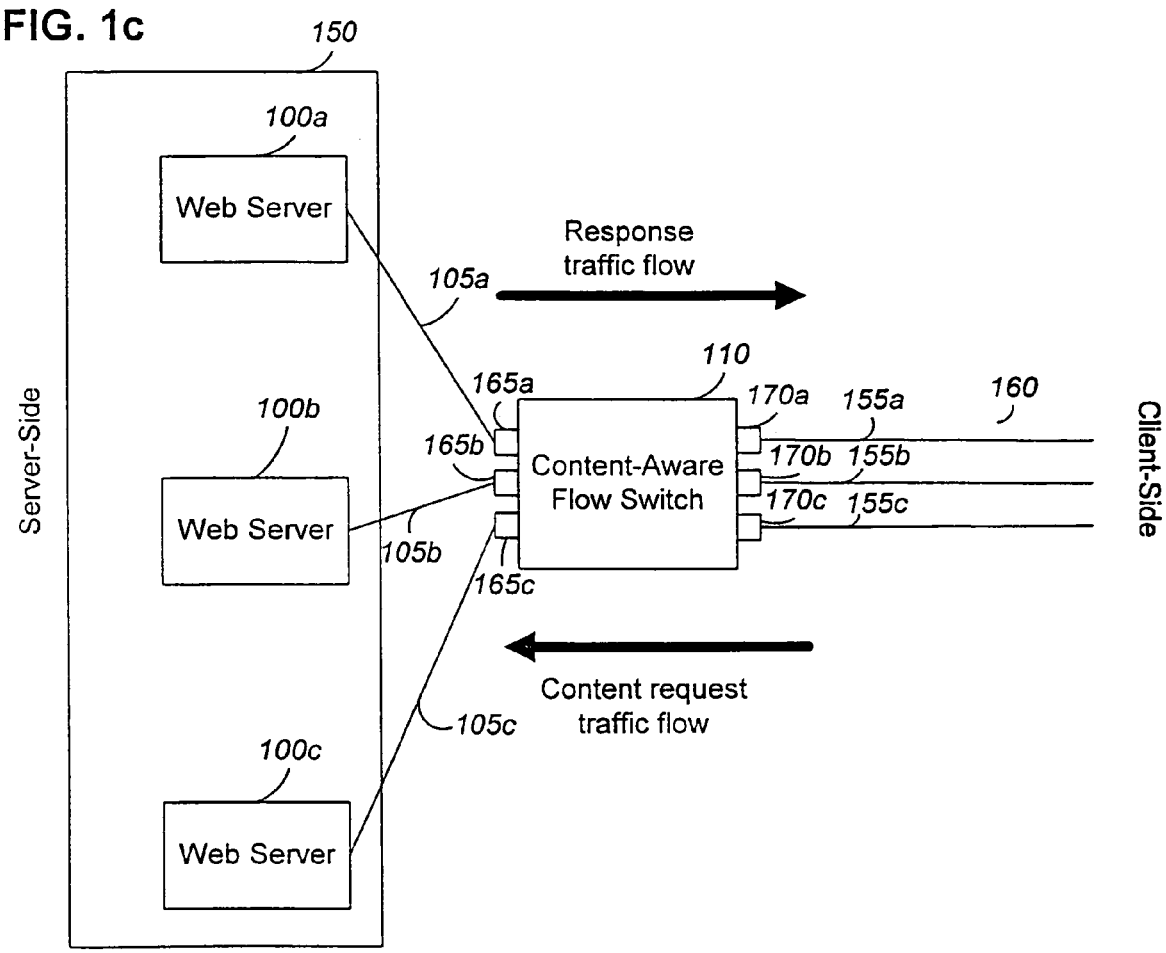
FIG. 1c is a block diagram of traffic flow through a content-aware flow switch.

Referring to FIG. 1c, a content-aware flow switch "front-ends" (i.e., intercepts all packets received from and transmitted by) a set of local web servers 100a–c, constituting a web server farm 150. Although connections to the web servers 100a–c are typically initiated by clients on the client side, most of the traffic between a client and the server farm 150 is from the servers 100a–c to the client (the response traffic). It is this response traffic that needs to be most carefully controlled by the flow switch 110.

The flow switch 110 has a number of physical ingress ports 170a–c and physical egress ports 165a–c. Each of the physical ingress ports 170a–c may act as one or more logical ingress ports, and each of the physical egress ports 165a–c may act as one or more logical egress ports in the procedures described below. Each of the web servers 100a–c is network accessible to the content-aware flow switch 110 via one or more of the physical egress ports 165a–c. Associated with each flow controlled by the flow switch 110 is a logical ingress port and a logical egress port.

The flow switch 110 is connected to an internet through uplinks 155a–c. When a client content request is accepted by the flow switch 110, the flow switch 110 establishes a full-duplex logical connection between the client and one of the web servers 100a–c through the flow switch 110. Individual flows are aggregated into pipes, as described in more detail below. Request traffic flows from the client toward the server and response traffic flows from the server to the client. A component of the flow switch 110, referred to as the Flow Admission Control (FAC), polices if and how flows are admitted to the flow switch 110, as described in more detail below.

The content-aware flow switch 110 differs from typical layer 2 and layer 3 switches in several respects. First, the data plane of layer 2 and layer 3 switches forwards packets based on the destination addresses in the packet headers (the MAC address and header information in the case of a layer 2 switch and the destination IP address in the case of a layer 3 switch). The content-aware flow switch 110 switches packets based on a combination of source and destination IP addresses, transport layer protocol, and transport layer source and destination port numbers. Furthermore, the functions performed in the control plane of typical layer 2 and layer 3 switches are based on examination of the layer 2 and layer 3 headers, respectively, and on well-known bridging and routing protocols. The control plane of the content-aware flow switch 110 also performs these functions, but additionally derives the forwarding path from information contained in the packet headers up to and including layer 5. In addition, content-induced QoS and bandwidth requirements, server loading and network path optimization are also considered by the content-aware flow switch 110 when selecting the most optimal path for a packet, as described in more detail below.

Figure 2:
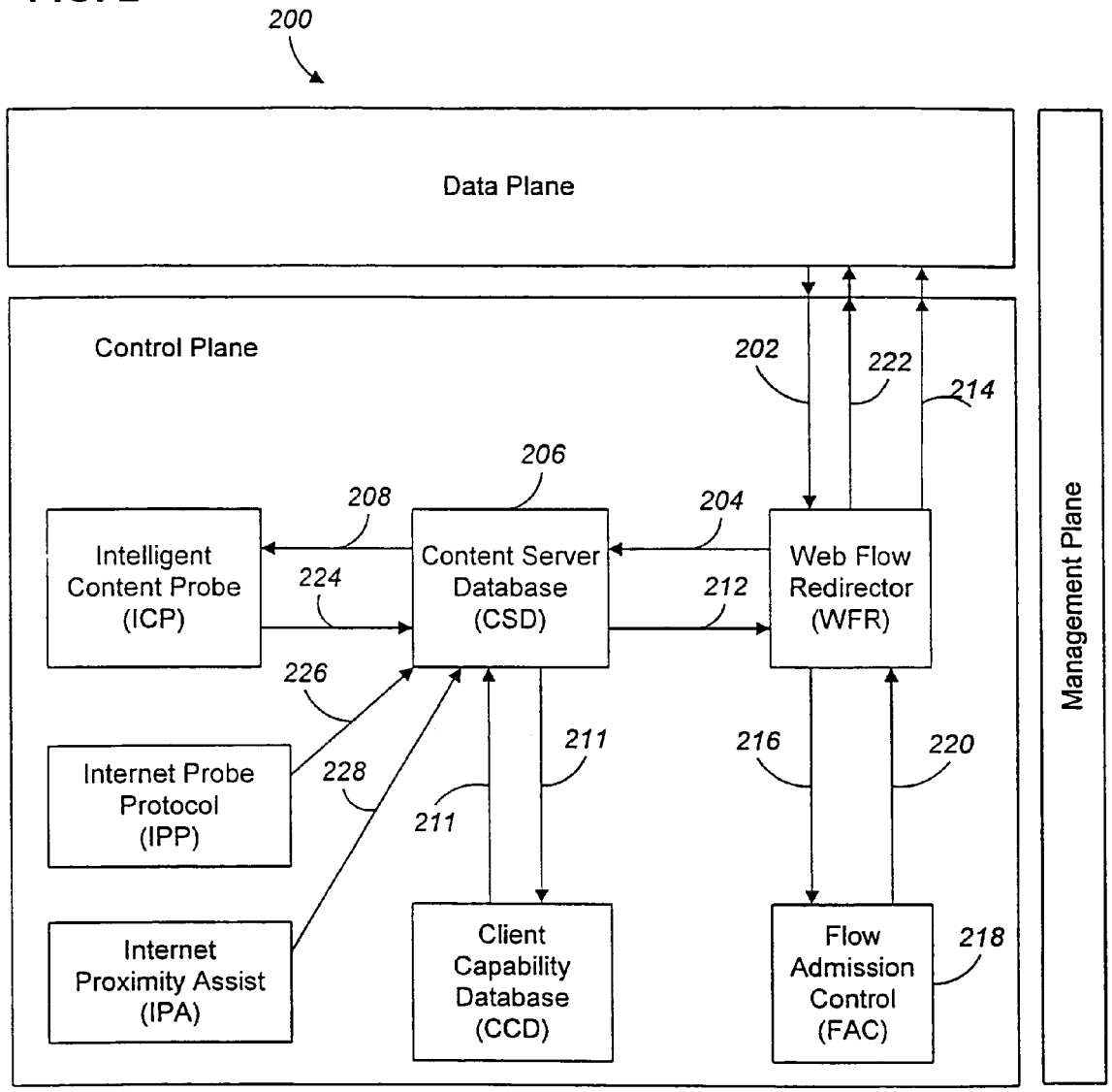
FIG. 2 is a block diagram illustrating operations performed by and communications among components of a content-aware flow switch during flow setup.

FIG. 2 is a block diagram illustrating, at a high level, operations performed by and communications among components of the content-aware flow switch 110 during flow setup. An arrow between two components in FIG. 2 indicates that communication occurs in the direction of the arrow between the two components connected by the arrow.

Referring to FIG. 2, the content-aware flow switch 110 includes: a Web Flow Redirector (WFR), an Intelligent Content Probe (ICP), a Content Server Database (CSD), a Client Capability Database (CCD), a Flow Admission Control (FAC), an Internet Probe Protocol (IPP), and an Internet Proximity Assist (IPA).

The CSD maintains several databases containing information about content flow characteristics, content locality, and the location of and the load on servers, such as servers 100a–c and 120a–b. One database maintained by the CSD contains content rules, which are defined by the system administrator and which indicate how the flow switch 110 should handle requests for content. Another database maintained by the CSD contains content records which are derived from the content rules. Content records contain information related to particular content, such as its associated IP address, URL, protocol, layer 4 port number, QoS indicators, and the load balance algorithm to use when accessing the content. A content record for particular content also points to server records identifying servers containing the particular content. Another database maintained by the CSD contains server records, each of which contains information about a particular server. The server record for a server contains, for example, the server's IP address, protocol, a port of the server through which the server can be accessed by the flow switch 110, an indication of whether the server is local or remote with respect to the flow switch 110, and load metrics indicating the load on the server.

Information in the CSD is periodically updated from various sources, as described in more detail below. The WFR, CSD, and FAC are responsible for selecting a server to service a content request based on a variety of criteria. The FAC uses server-specific and content-specific information together with client information and QoS requirements to determine whether to admit a flow to the flow switch 110. The ICP is a lightweight HTTP client whose job is to populate the CSD with server and content information by probing servers for specific content that is not found in the CSD during a flow setup. The ICP probes servers for several reasons, including: (1) to locate specific content that is not already stored in the CSD, (2) to determine the characteristics of known content such as its size, (3) to determine relationships between different pieces of content, and (4) to monitor the health of the servers. ICPs on various flow switches communicate with each other using the IPP, which periodically sends local server load and content information to neighboring content-aware flow switches. The CCD contains information related to the known capabilities of clients and is populated by sampling specific flows in progress. The IPA periodically updates the CSD on the internet proximity of servers and clients.

A flow setup request may take the form of a TCP SYN from a client being forwarded to the WFR (202). The WFR passes the flow setup request to the CSD (204). The CSD determines which servers, if any, are available to service the flow request and generates a list of such candidate servers (206). This list of candidate servers is ordered based on configurable CSD preferences. The individual items within this list contain all the information the FAC will ultimately need to make flow admission decisions.

If more than one server exists in the server farm 150 and content is not fully replicated among the servers in the server farm, then it may not be possible for the CSD to identify any candidate servers based upon the receipt of the TCP SYN alone. In this case, the CSD returns a NULL candidate server list to the WFR with a status indicator requesting that the TCP connection is to be spoofed and that the subsequent HTTP GET is to be forwarded to the CSD (212).

If the CSD contains no content records for servers that can satisfy the received TCP SYN or HTTP GET, a NULL list is returned to the WFR with a status indicator indicating that the flow request should be rejected (212). If the CSD finds a content record that satisfies the HTTP GET but does not find a record for the specific piece of content requested, a new content record is created containing default values for the specific piece of content requested. The new record is then returned to the WFR (212). In either of these two cases (i.e., the CSD finds no matching records, or the CSD finds a matching record that does not exactly match the requested content), the CSD asks the ICP to probe the local servers (using http "HEAD" operations) to determine where the content is located and to deduce the content's QoS attributes (208).

The CSD then asks the CCD for information related to the client making the request (211). The CCD returns any such information in the CCD to the CSD (210). The CSD returns an ordered list of candidate servers and any client information obtained from the CCD to the WFR (212).

Depending on the response returned from the CSD, the WFR will either: (1) reject, TCP spoof, or redirect the flow as appropriate (214), or (2) forward the flow request, the list of candidate servers, and any client information to the FAC for selection and local setup (216). The FAC evaluates the list of servers contained in the content record, in the order specified by the CSD, and looks for a server that can accept the flow (218). The FAC's primary consideration in selecting a server from the list of candidate servers is that sufficient port and switch resources be available on the content-aware flow switch to support the flow. An accepted flow is assigned either to a VC-pipe or to a flow pipe, as appropriate. (VC-pipes and flow pipes are described in more detail below.) The FAC also adjusts flow weights as necessary to maintain flow pipe bandwidth.

The FAC informs the WFR of which local server, if any, was chosen to accept the flow, and provides information to the WFR indicating to which specific VC-pipe or flow pipe the flow was assigned (220). The WFR sets up the required network address translations for locally accepted flows so that future packets within the flow can be modified appropriately (222). If the chosen server is "remote" (not in the local server farm) (220), an HTTP redirect is generated (222) that causes the client to go to the chosen remote site for service.

In addition to the steps described above, which occur as part of the flow setup process, the components shown in FIG. 2 perform several other tasks, including the following. Periodically, the ICP probes the servers 100*a–c* front-ended by the content-aware flow switch 110 for information regarding server status and content. This activity may be undertaken proactively (such as polling for general server health) or at the request of the CSD. The ICP updates the CSD with the results of this search so that future requests for the same content will receive better service (224).

The IPP periodically sends local server load and content information to neighboring content-aware flow switches. Data arriving from these peers is evaluated and appropriate updates are sent to the CSD (226). The IPA periodically updates the CSD with internet proximity information (228).

The operation of the components shown in FIG. 2 is now described in more detail.

Figure 3:
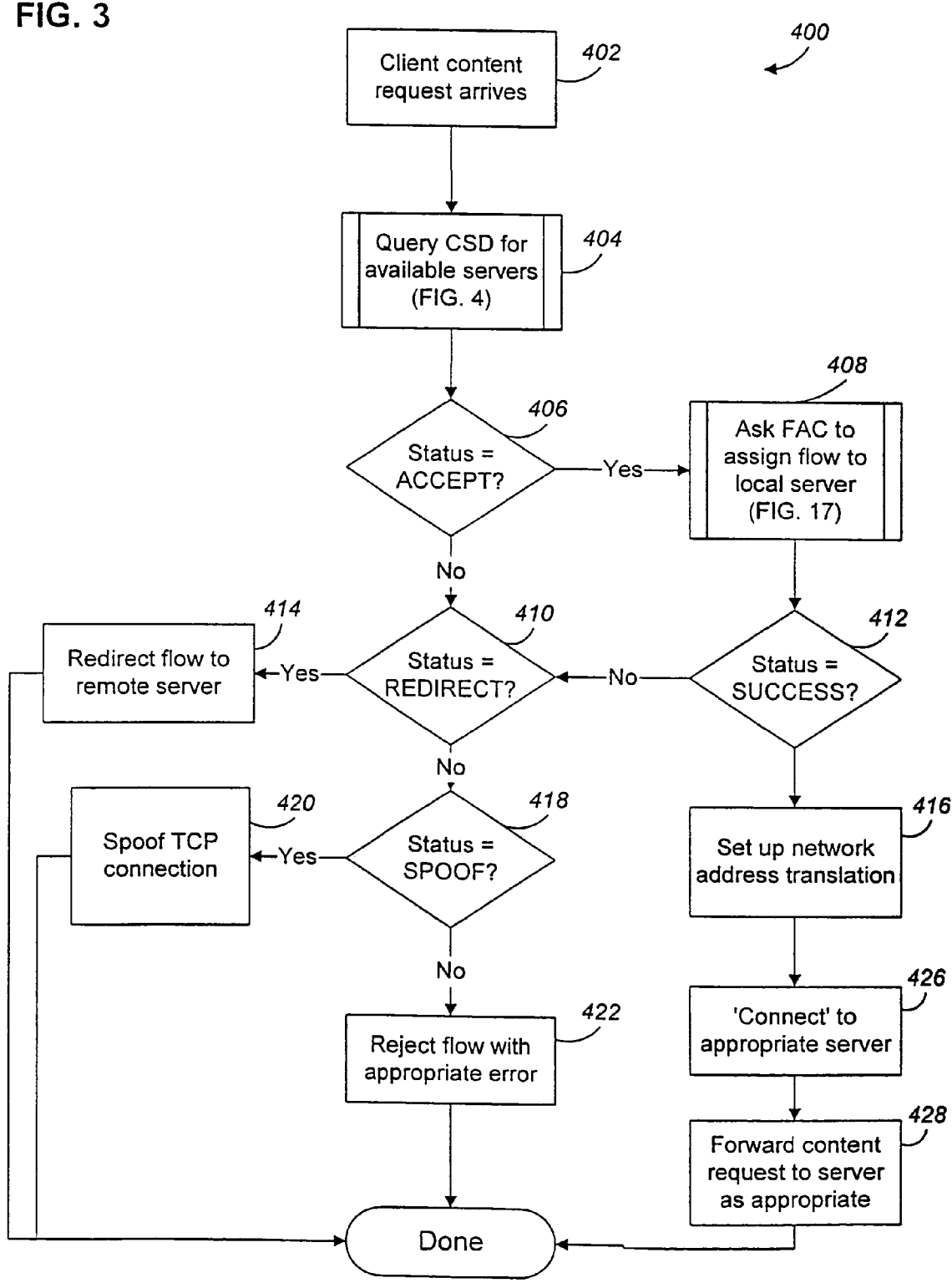
FIG. 3 is a flow chart of a method for servicing a content request using a content-aware flow switch.

Referring to FIG. 3, the WFR services a client content request as follows. When a client sends a content request to a server in the form of a TCP SYN or HTTP GET, the content request is intercepted by the content-aware flow switch 110, which interprets the request as a request to initiate a flow between the client and an appropriate server (step 402). The CSD is queried for a list of available servers to serve the content request (step 404). The CSD returns a list of candidate servers and the status indicator ACCEPT if the preferred server is known to be in the local server farm. If the CSD returns a status indicator ACCEPT (decision step 406), then the content request may be served at one of the local servers 100*a–c* front-ended by the flow switch 110. In this case, the FAC is asked to assign a flow for servicing the content request to a local server, chosen from among the list of candidate servers returned by the CSD (step 408). If the FAC successfully assigns the flow to a local server (decision step 412), then an appropriate network address translation for the flow is set up (step 416), a connection is set up with the appropriate server (using a pre-cached, persistent, or newly created connection) (step 426), and the content request is passed to the server (step 428).

If the CSD is unable to identify any local servers to serve the content request (decision step 406), or if the FAC is unable to assign a flow for the content request to a local server (decision step 412), then if the status indicator (returned by either the CSD in step 404 or the FAC in step 408) indicates that the flow should be redirected to a remote server (step 410), then the flow is redirected to a remote server (step 414). If the CSD indicated (in step 404) that the flow should be spoofed (decision step 418), then the client TCP request is spoofed (step 420). If the flow cannot be assigned to any server, then the flow is rejected with an appropriate error (step 422).

Figure 4:
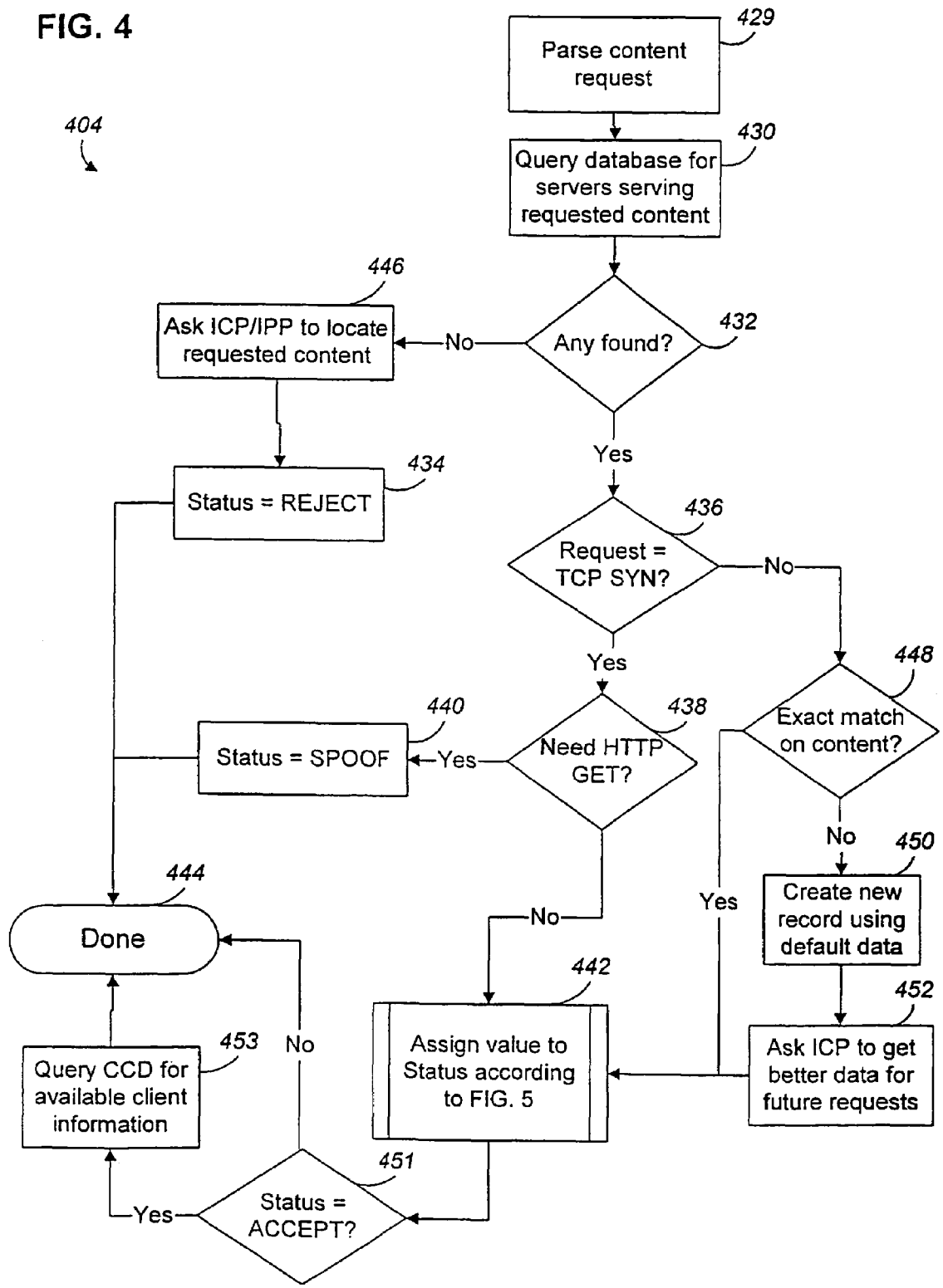
FIG. 4 is a flow chart of a method for parsing a flow setup request.

Referring to FIG. 4, the CSD parses a flow setup request as follows. First, the CSD parses the URI representing the client content request in order to identify the nature of the requested content (step 429). If the request is an HTTP request, for example, elements of the HTTP header, including the HTTP content-type, are extracted. In the case of a non-HTTP request, the combination of protocol number and source/destination port are used to identify the nature of the requested content. In the case of an HTTP request, the content-type or filename extension is used to deduce a QoS class, delay, minimum bandwidth, and frame loss ratio as shown in Table 1, below. The content-size is used to determine the size of the requested flow. Overall flow intensity is monitored by the content-aware flow switch 110 by calculating the average throughput of all flows. The degree to which a particular piece of content served by a server is "hot content" is measured by monitoring the number of hits (requests) the content receives. The burstiness of a flow is determined by calculating the number of flows per content per time unit.

Identifying the nature of the requested content also involves deducing, from the content request and information stored in the CSD, the QoS requirements of the requested content. These QoS requirements include:

Bandwidth, defined by the number of bytes of content to be transferred over the average flow duration.

Delay, defined as the maximum delay suitable for retrieving particular content.

Frame Loss Ratio, defined as the maximum acceptable percentage of frame loss tolerated by the particular type of content.

A QoS class is assigned to a flow based on the flow's calculated QoS requirements. Eight QoS classes are supported by the flow switch 110. Table 1 indicates how these classes might be used.

TABLE 1

| QoS Class | Delay (End to End) | Min Bandwidth | Frame Loss Ratio | Example Applications |
|---|---|---|---|---|
| 0 | N/A | N/A | $10^{-8}$ | Control Flows |
| 1 | <250 ms | 8 KBPS | $10^{-8}$ | Internet Phone |
| 2 | Interactive | 4 KBPS | $10^{-4}$ | Distance Learning, Telemetry, streaming video/audio |
| 3 | 500 ms | 0–16 Mbps | $10^{-4}$ | Media distribution, multi-user games, interactive TV |
| 4 | Low | 64 KBPS | Data: $10^{-8}$ Streaming: $10^{-4}$ | Entertainment, traditional fax |
| 5 | Low | N/A | $10^{-8}$ | Stock Ticker, News |
| 6 | N/A | N/A | $10^{-8}$ | Service Distribution, Internet Printing |
| 7 | N/A/ | N/A | $10^{-4}$ | Best effort traffic (email, Internet fax, database, etc.) |

After the nature of the requested content has been identified, the CSD queries its database for records of candidate servers containing the requested content (step 430). If the CSD cannot find any records in the database to satisfy a given content request (decision step 432), the ICP/IPP is asked to locate the requested content, in order to increase the probability that future requests for the requested content will be satisfied (step 446). The CSD then returns a NULL list to the WFR with a status indicator indicating that the flow request should be rejected (steps 434, 444).

If one or more matching server records are found (decision step 432) and the client request is in the form of a HTTP GET (decision step 436), then the CSD determines whether any of the existing content records exactly matches the requested content (decision step 448). For example, consider a content request for http://www.company.com/document.html. The CSD will consider a content record for http://www.company.com/* to be an exact match for the content request. The CSD will consider a record for http://www-.company.com/ to be a match for the request, but not the most specific match. In the case of an exact match, the CSD sorts the list of candidate servers (identified in step 430) based on configurable preferences (step 442). In the case of at least one match but no exact matches, the CSD creates a new record containing default information extracted from the most specific matching record, as well as additional information gleaned from the content request itself (step 450). This additional information may include the QoS requirements of the flow, based on the port number of the content request, or the filename extension (e.g., ".mpg" might indicate a video clip) contained in the request. The CSD asks the ICP/IPP to probe, in the background, for more specific information to use for future requests (step 452).

If one or more server records are found (decision step 432) and the client content request is in the form of a TCP SYN (decision step 436), the mere receipt by the flow switch of a TCP SYN may not provide the CSD with enough information about the nature of the requested flow for the CSD to make a determination of which available servers can service the requested flow. For example, the TCP SYN may indicate the server to which the content request is addressed, but not indicate which specific piece of content is being requested from the server. If receipt of a HTTP GET from the client is required to identify a server to serve the content request (decision step 438), then the CSD returns a NULL server list to the WFR with a status indicator requesting that the TCP connection be spoofed and that the subsequent HTTP GET from the client be forwarded to the CSD (step 440).

If the TCP SYN is adequate to identify a server to service the content request (decision step 438), then the CSD sorts the list of candidate servers (identified in step 430) based on configurable preferences (step 442).

If adequate information was available in the content request to generate a list of available servers (decision step 432) and the request may be serviced by one of the servers locally attached to the data switch (decision step 451), then the Client Capability Database (CCD) is queried for any available information on the capabilities of the requesting client (step 453).

Figure 5:
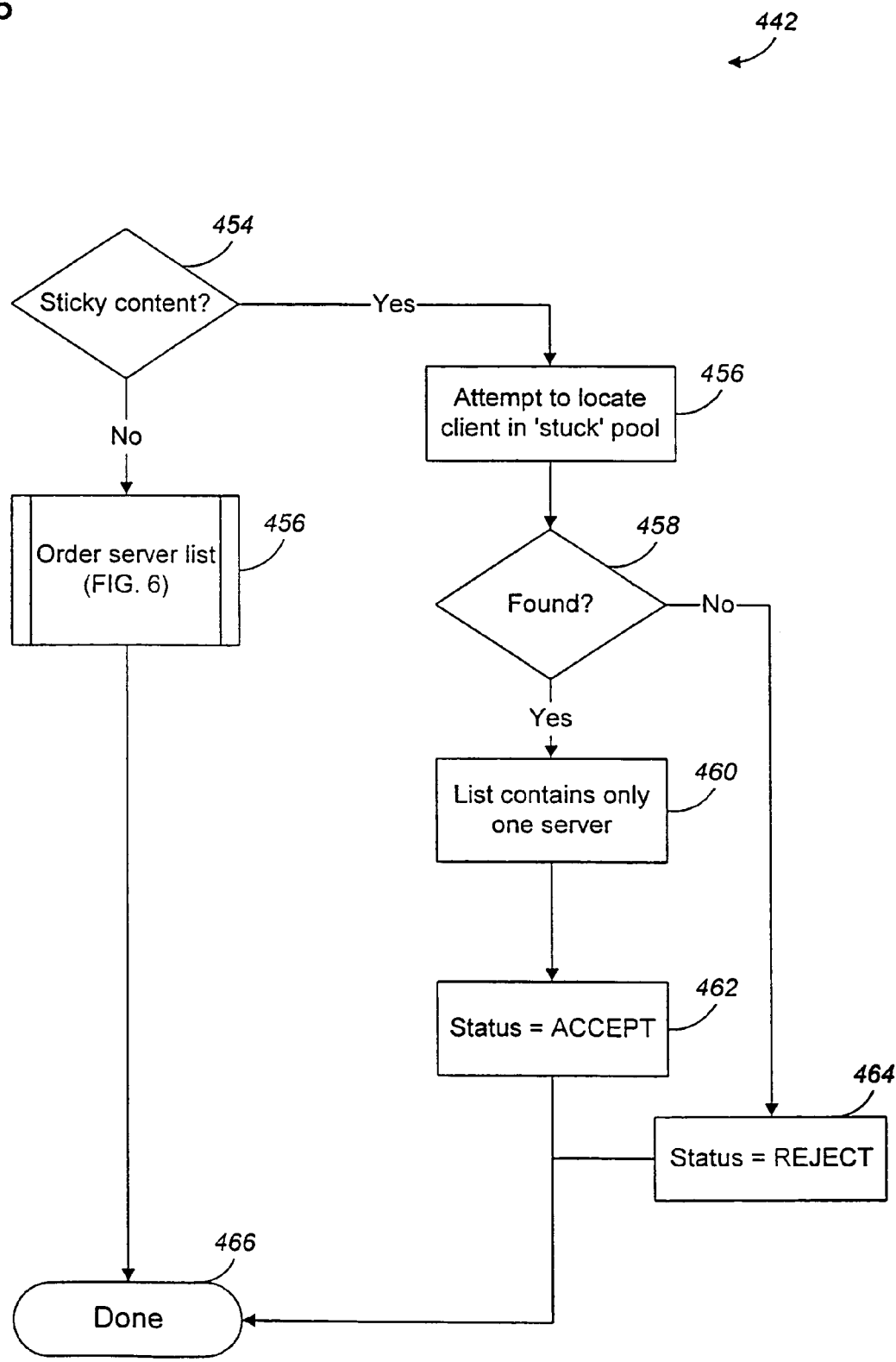
FIGS. 5 and 6 are flow charts of methods for sorting a list of candidate servers.

Referring to FIG. 5, given a content request and a list of candidate servers, the CSD sorts the list of candidate servers as follows. If the CSD content records indicate that the requested content is "sticky" (i.e., that a client who accesses such content must remain attached to a single server for the duration of the transaction between the client and the server, which could be comprised of multiple individual content requests) (decision step 454), then the CSD searches an internal database to determine to which server this client was previously "stuck" (step 456). If the CSD finds no record for this client (decision step 458), then the CSD indicates that the request should be rejected (step 464). If the CSD finds a record of this client (decision step 458), then the CSD creates and returns a list of candidate servers which includes only the "sticky" server to which the client was previously "stuck" (step 460), and indicates that a local server to serve the content request was found (step 462). If the requested content is not "sticky" (decision step 454), then the list of candidate servers is ordered according to the method of FIG. 6 (step 456).

Figure 6:
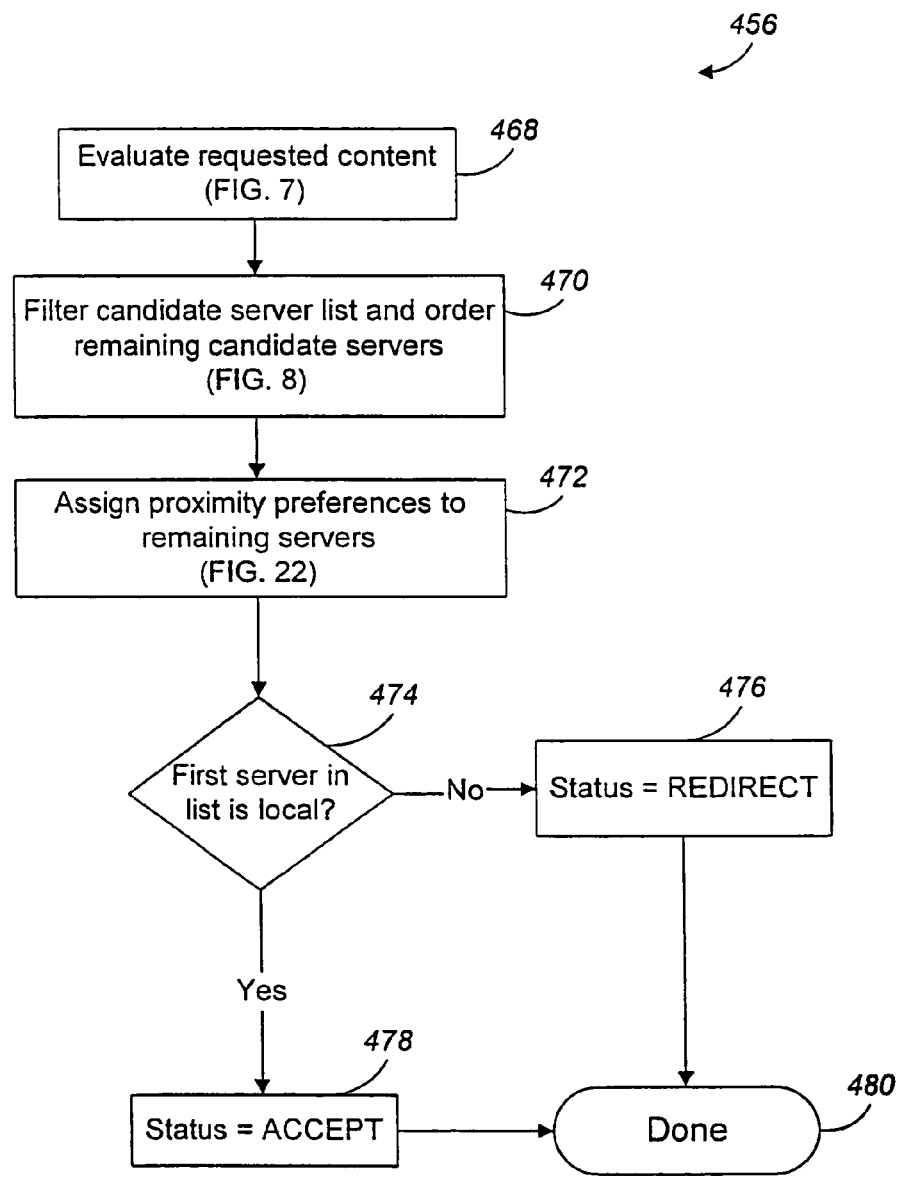

Referring to FIG. 6, the CSD orders the list of candidate servers as follows. The CSD evaluates the requested content according to several criteria (step 468). The CSD filters the candidate server list and orders (sorts) the candidate servers remaining in the candidate server list (step 470). Servers in the candidate server list are assigned proximity preferences (step 472).

If the first server in the sorted list of candidate servers is a remote server (decision step 474), then the CSD assigns a value of REDIRECT to a status indicator (step 476). If the first server in the sorted list of candidate servers is a local server (decision step 474), then the CSD assigns a value of ACCEPT to the status indicator (step 478). The CSD returns the status indicator and the ordered list of candidate servers (step 480).

Figure 7:
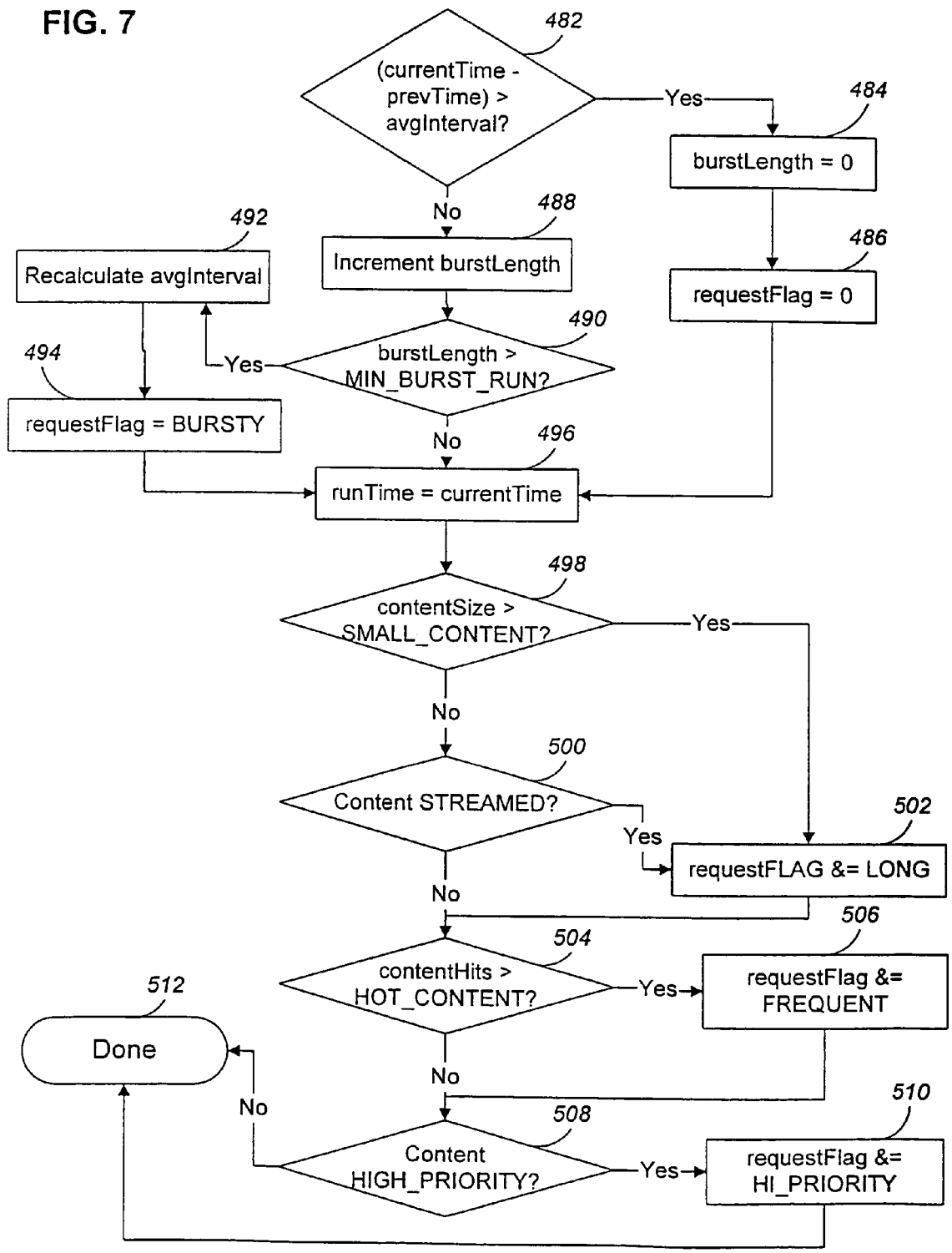
FIG. 7 is a flow chart of a method for evaluating requested content.

Referring to FIG. 7, a particular requested content is evaluated by the CSD as follows. A variable requestFlag is used to store several flags (values which can be either true or false) relating to the requested content. Flags stored in requestFlag include BURSTY (indicating whether the requested content is undergoing a burst of requests), LONG (indicating that this the request is likely to result in a long-lived flow), FREQUENT (indicating that the requested content is frequently requested), and HI_PRIORITY (indicating that the requested content is high priority content).

If the current time at which the requested content is being requested minus the previous time at which the requested content was requested is not greater than avgInterval (the average period of time between flow requests for the requested content) (decision step 482), then a variable burstLength is assigned a value of zero (step 484) and requestFlag is assigned a value of zero (step 486). Otherwise (decision step 482), the value of the variable burstLength is incremented (step 488), and if the value of burstLength is greater than MIN_BURST_RUN (decision step 490), then avgInterval is recalculated (step 492), and the variable requestFlag is assigned a value of BURSTY (step 494). MIN_BURST_RUN is a configurable value which indicates how many sub-avgInterval requests for a given piece of content constitute the beginning of a burst.

A variable runTime is set equal to the current time (step 496). A flag requestFlag is used to store several pieces of information describing the requested content. If the size of the requested content is greater than a predetermined constant SMALL_CONTENT (decision step 498), then the LONG flag in requestFlag is set (step 502). If the requested content is streamed (decision step 500), then the LONG flag in requestFlag is set (step 502). If the number of hits the requested content has received is greater than a predetermined constant HOT_CONTENT (decision step 504), then the FREQUENT flag in requestFlag is set (step 506). If the requested content has previously been flagged as HIGH_PRIORITY (decision step 508), then the HI_PRIORITY flag in requestFlag is set (step 510).

Figure 8:
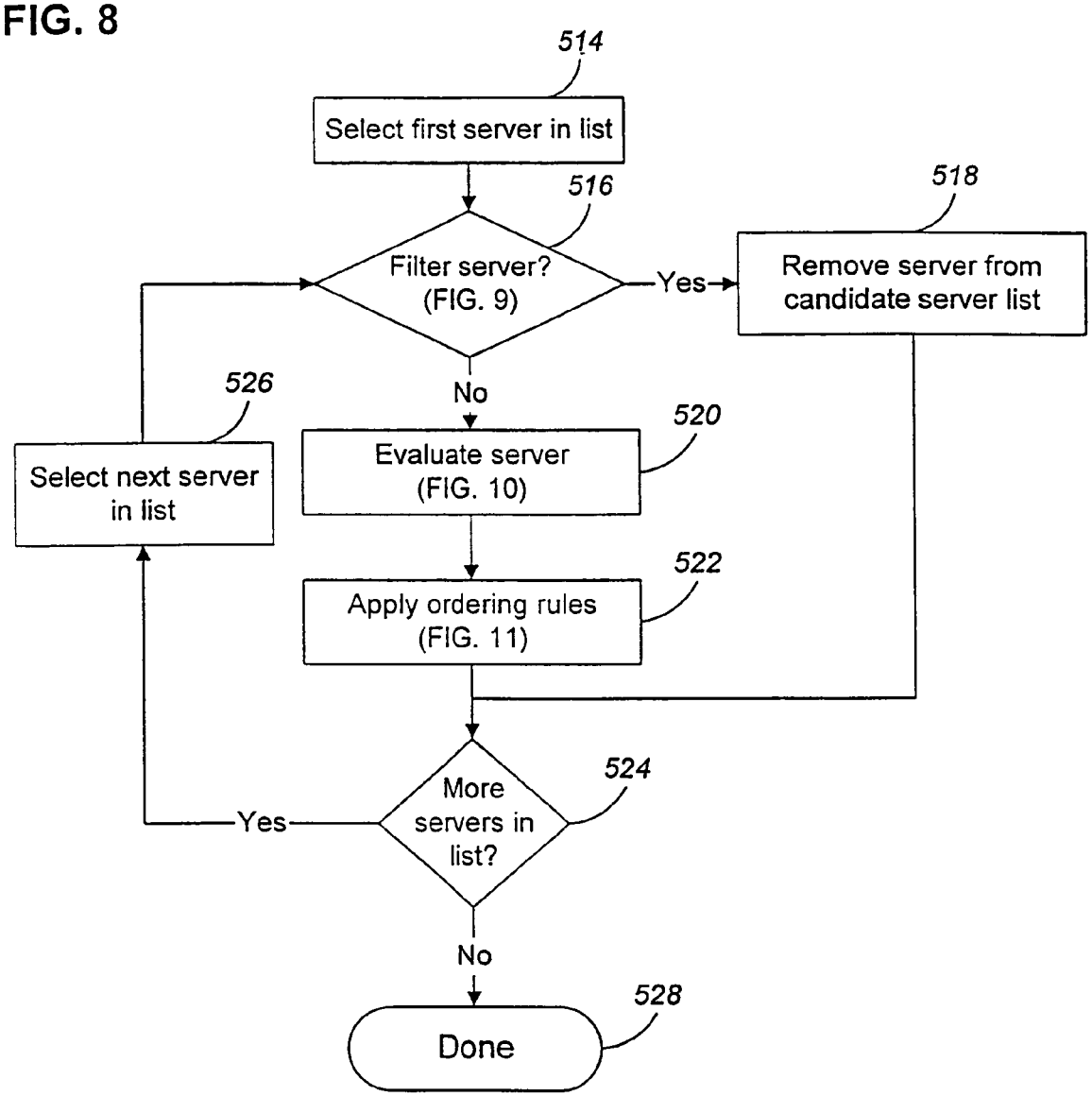
FIG. 8 is a flow chart of a method for sorting a list of candidate servers.

Referring to FIG. 8, the CSD assigns status indicators to the servers in the candidate server list as follows. The first server in the candidate server list is selected (step 514). If the selected server should be filtered (decision step 516), then the selected server is removed from the candidate server list (step 518). Otherwise, the server is evaluated (step 520), and ordering rules are applied to the selected server to assign a status indicator to the selected server (step 522). If there are more servers in the candidate server list (decision step 524), then the next server in the candidate server list is selected (step 526), and steps 516–524 are repeated. Otherwise, assignment of status indicators to the servers in the candidate server list is complete (step 528).

Figure 9:
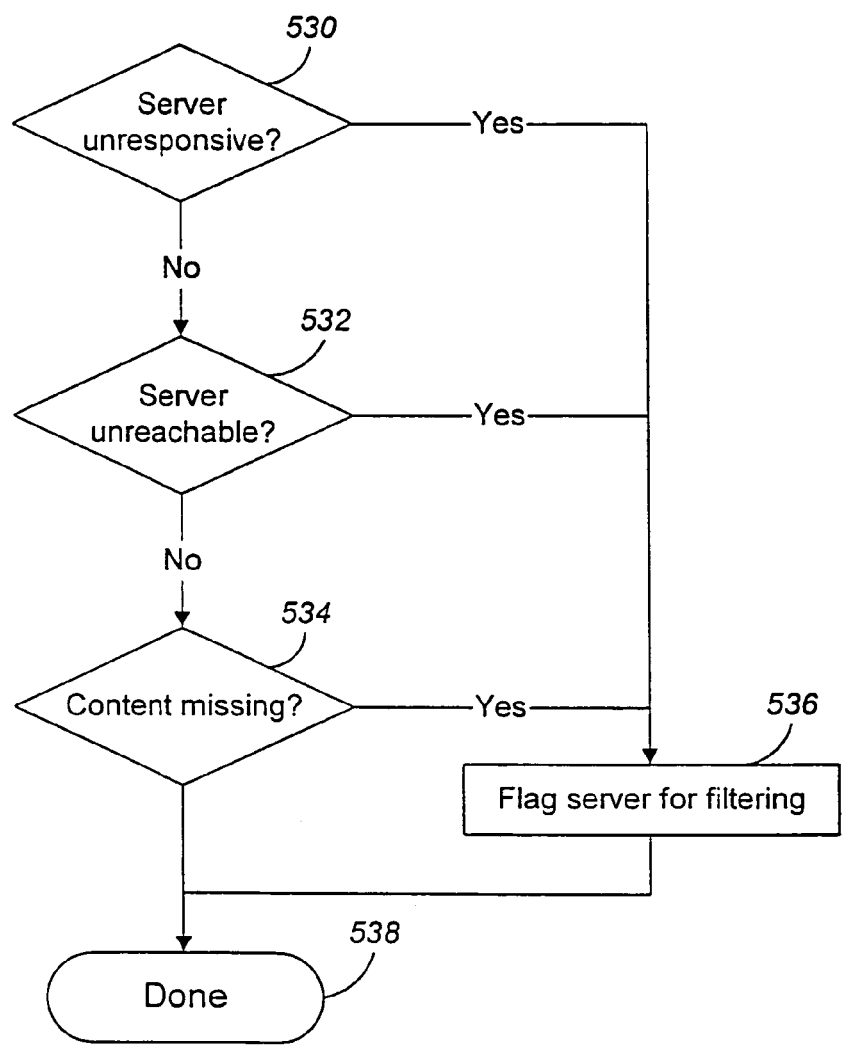
FIG. 9 is a flow chart of a method for filting servers from a list of candidate servers.

Referring to FIG. 9, servers are filtered from the candidate server list as follows. If a server has not responded to recent queries (decision step 530), is no longer reachable due to a network topology change (decision step 532), or no longer contains the requested content (indicated by an HTTP 404 error in response to a request for the requested content), then the server is flag for removal from the candidate server list (step 536).

Figure 10:
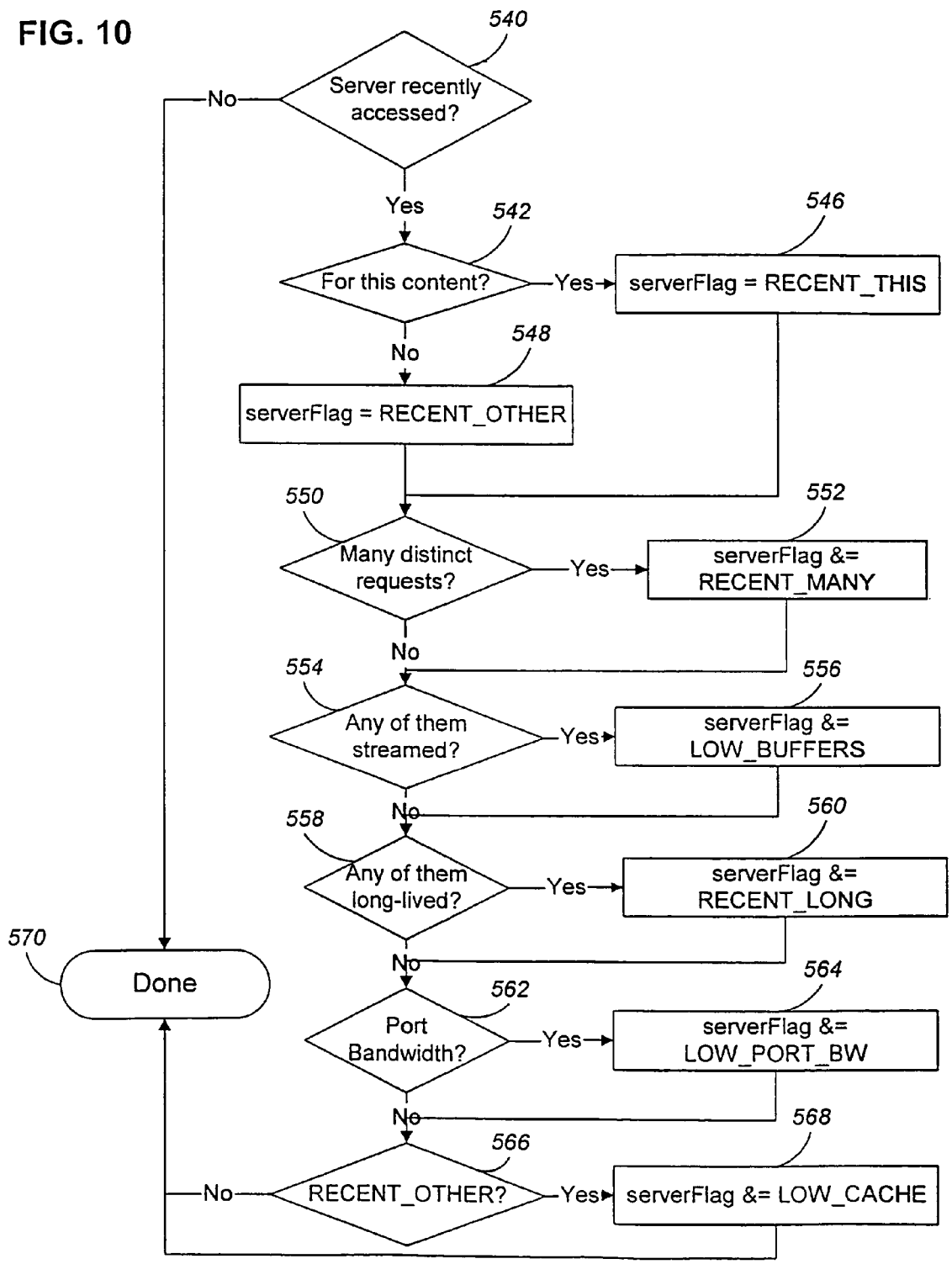
FIG. 10 is a flow chart of a method for evaluating a server in a list of candidate servers.

Referring to FIG. 10, a server in the candidate server list is evaluated as follows. A variable serverFlag is used to store several flags relating to the server. Flags stored in serverFlag include RECENT_THIS (indicating that a request was recently made to the server for the same content as is being requested by the current content request), RECENT_OTHER (indicating that a request was recently made to the server for content other than the content being requested by the current content request), RECENT_MANY (indicating that many distinct requests for content have recently been made to the server), LOW_BUFFERS (set to TRUE when one or more recent requests have been streamed), RECENT_LONG (indicating that one or more of the server's recent flows was long-lived), LOW_PORT_BW (indicating that the server's port bandwidth is low), and LOW_CACHE (indicating that the server is low on cache resources).

If the server was not recently accessed (decision step 540), then none of the flags in serverFlag are set, and evaluation of the server is complete (step 570). Otherwise, if the server was recently accessed for the same content as is being requested by the current content request (decision step 542), then serverFlag is assigned a value of RECENT_THIS (step 546); otherwise, serverFlag is assigned a value of RECENT_OTHER (step 548). If there have been many recent distinct requests to the server (decision step 550), then the RECENT_MANY flag in serverFlag is set (step 552). If any of the recent requests to the server were streamed (decision step 554), then the LOW_BUFFERS flag of serverFlag is set (step 556). If any of the recent requests to the server were long-lived (decision step 558), then the RECENT_LONG flag of serverFlag is set (step 560). If the port bandwidth of the server is low (decision step 562), then the LOW_PORT_BW flag of serverFlag is set (step 564). If the RECENT_OTHER flag of serverFlag is set (decision step 566), then the LOW_CACHE flag of serverFlag is set (step 568).

Figure 11:
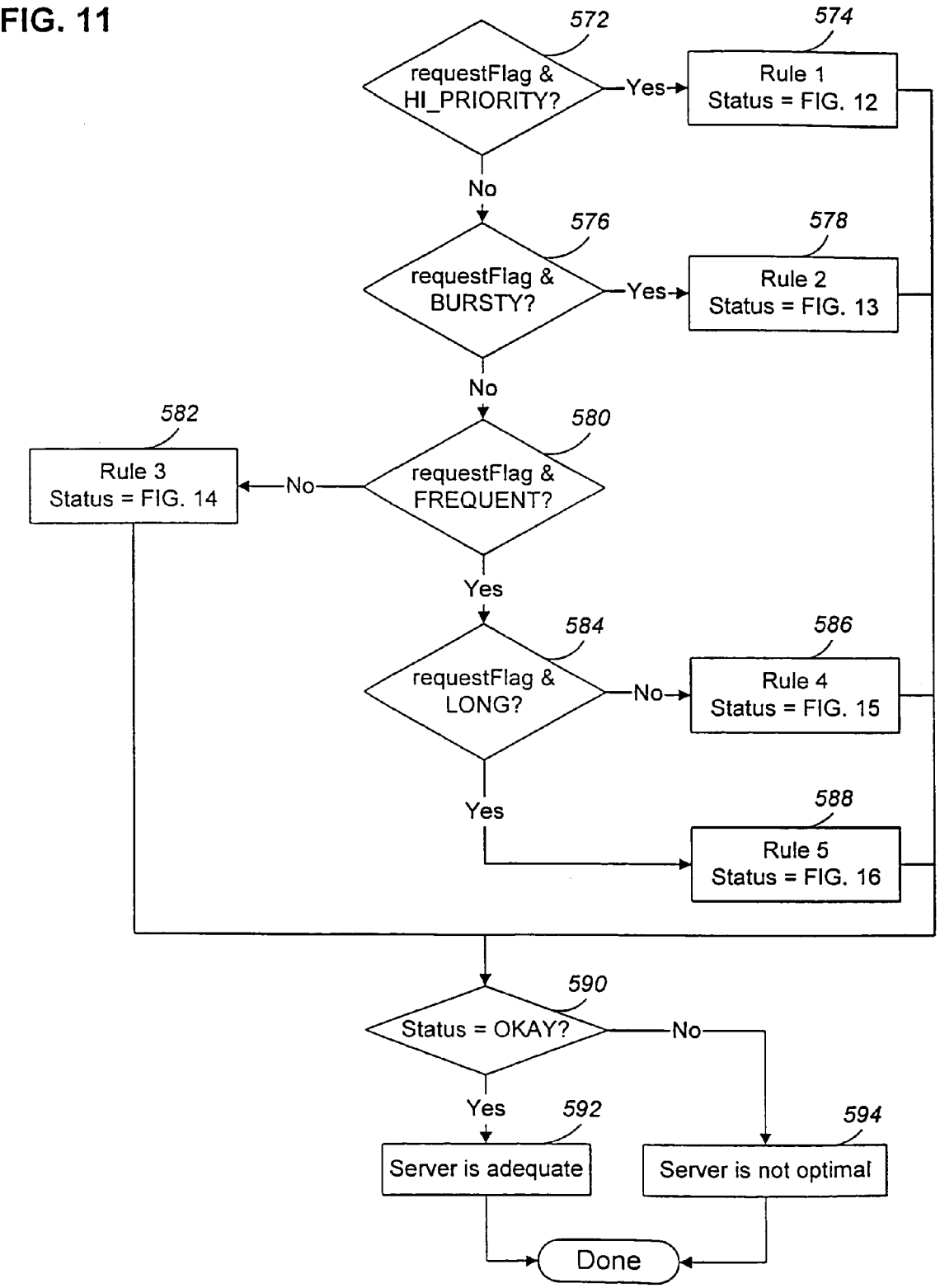
FIG. 11 is a flow chart of a method for ordering a server in a list of candidate servers.

Referring to FIG. 11, a server in the candidate server list is ordered within the candidate server list as follows. A variable Status is used to indicate whether the server should be placed at the bottom of the candidate server list. Specifically, if the HI_PRIORITY flag of requestFlag is set (decision step 572), then Status is assigned a value according to FIG. 12 (step 574). If the BURSTY flag of requestFlag is set (decision step 576), then Status is assigned a value according to FIG. 13 (step 578). If the FREQUENT flag of requestFlag is set (decision step 580), then Status is assigned a value according to FIG. 14 (step 582). If the LONG flag of requestFlag is set (decision step 584), then Status assigned a value according to FIG. 15 (step 586); otherwise, Status is assigned a value according to FIG. 16 (step 588). If the value of Status is not OKAY (decision step 590), then the server is considered not optimal and is placed at the bottom of the candidate server list (step 584). Otherwise, the server is considered adequate and is not moved within the candidate server list (step 592).

Figure 12:
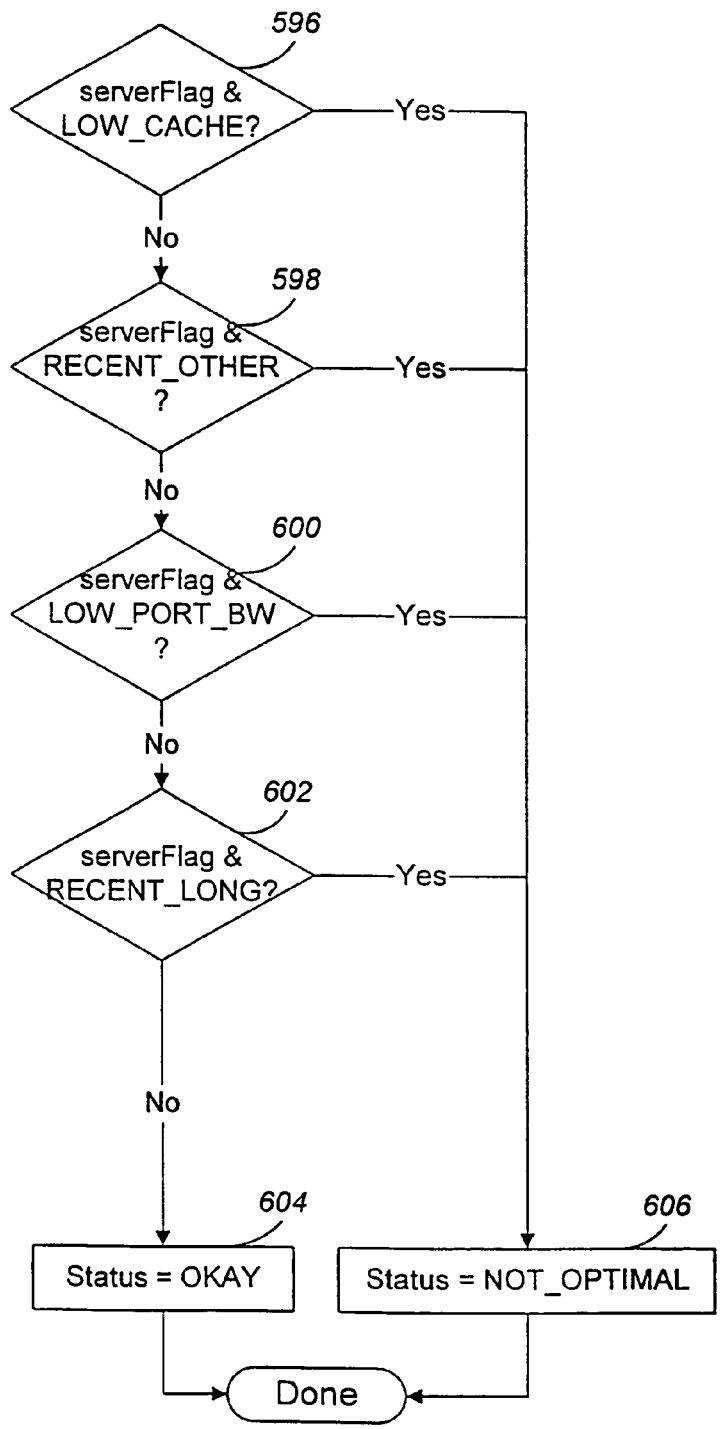
FIGS. 12–16 are flows charts of methods for assigning a status to a server for purposes of ordering the server in a list of candidate servers.

Referring to FIG. 12, in the case of a request for a flow for which the HI_PRIORITY flag of requestFlag is set, if the LOW_CACHE flag of serverFlag is set (decision step 596), the RECENT_OTHER flag of serverFlag is set (decision step 598), the LOW_PORT_BW flag of serverFlag is set (decision step 600), or the RECENT_LONG flag of serverFlag is set (decision step 602), then Status is assigned a value of NOT_OPTIMAL (step 608). Otherwise, Status is assigned a value of OKAY (step 604).

Figure 13:
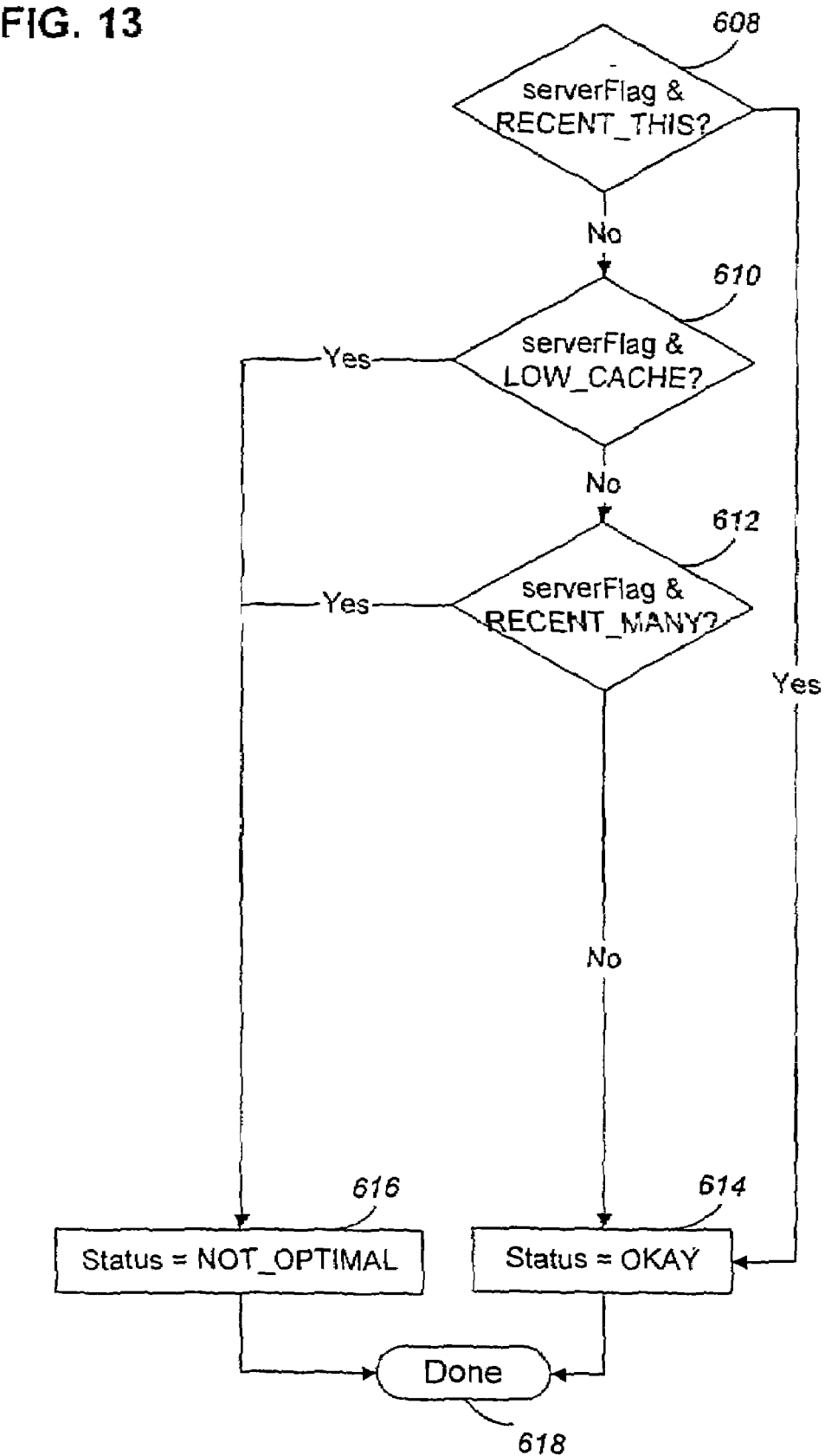

Referring to FIG. 13, in the case of a request for a flow for which the BURSTY requestFlag is set and the RECENT_THIS serverFlag is not set (decision step 608), and if either the LOW_CACHE or RECENT_MANY serverFlag is set (decision steps 610 and 612), then Status is assigned a value of NOT_OPTIMAL (step 616). Otherwise, Status is assigned a value of OKAY (step 614).

Figure 14:
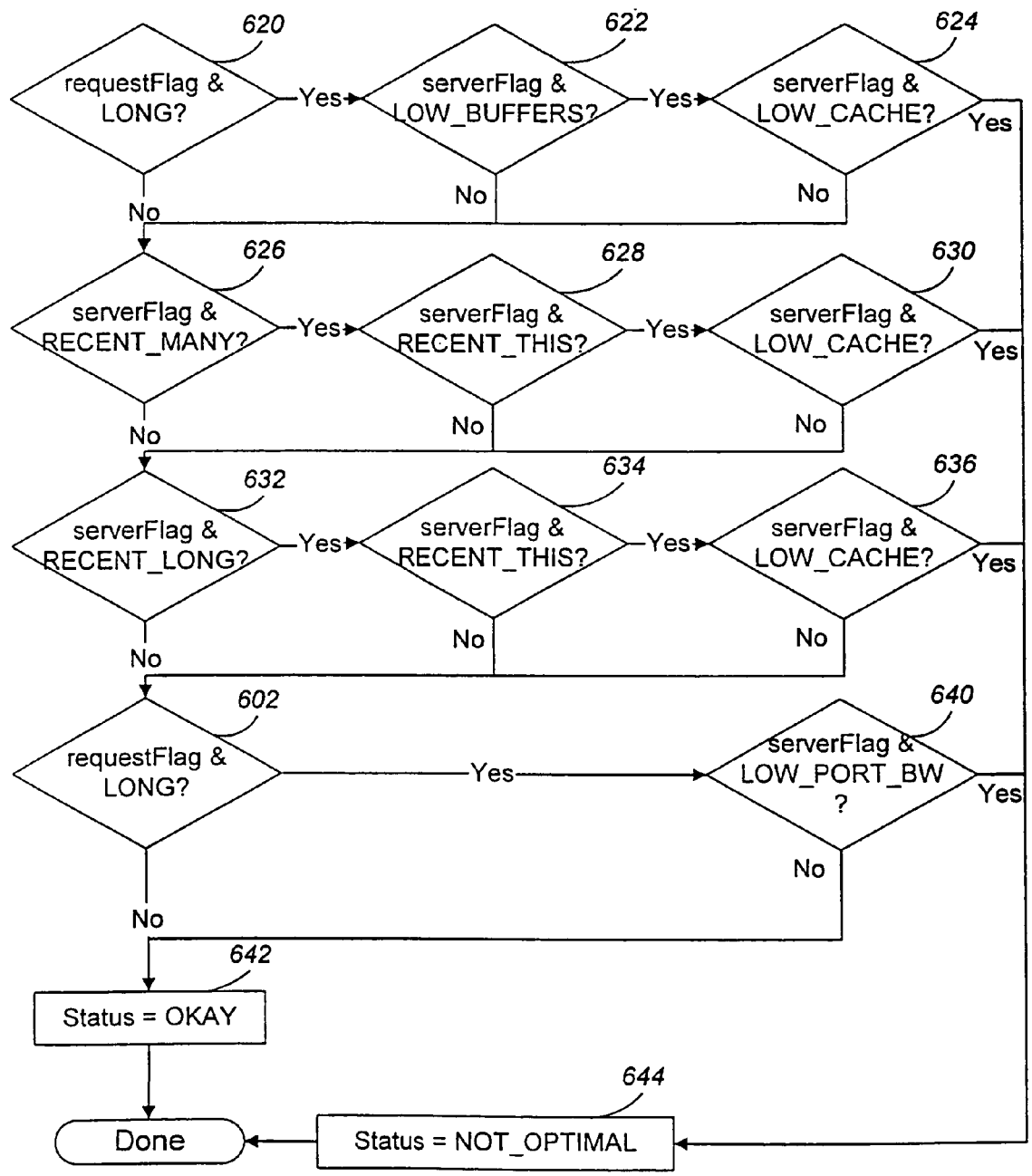

Referring to FIG. 14, a value is assigned to Status in the case of a request for a flow which is not bursty and not frequently requested as follows. Status is assigned a value of NOT_OPTIMAL (step 644) if any of the following conditions obtain: (1) the LONG flag of requestFlag is set and the LOW_BUFFERS and LOW_CACHE flags of serverFlag are set (decision steps 620, 622, and 624); (2) the RECENT_MANY, RECENT_THIS, and LOW_CACHE flags of serverFlag are set (decision steps 626, 628, and 630); (3) the RECENT_LONG, RECENT_THIS, and LOW_CACHE flags of serverFlag are set (decision steps 632, 634, and 636); or (4) the LONG flag of requestFlag is set and the LOW_PORT_BW flag of serverFlag is set (decision steps 638 and 640). Otherwise, Status is assigned a value of OKAY (step 642).

Figure 15:
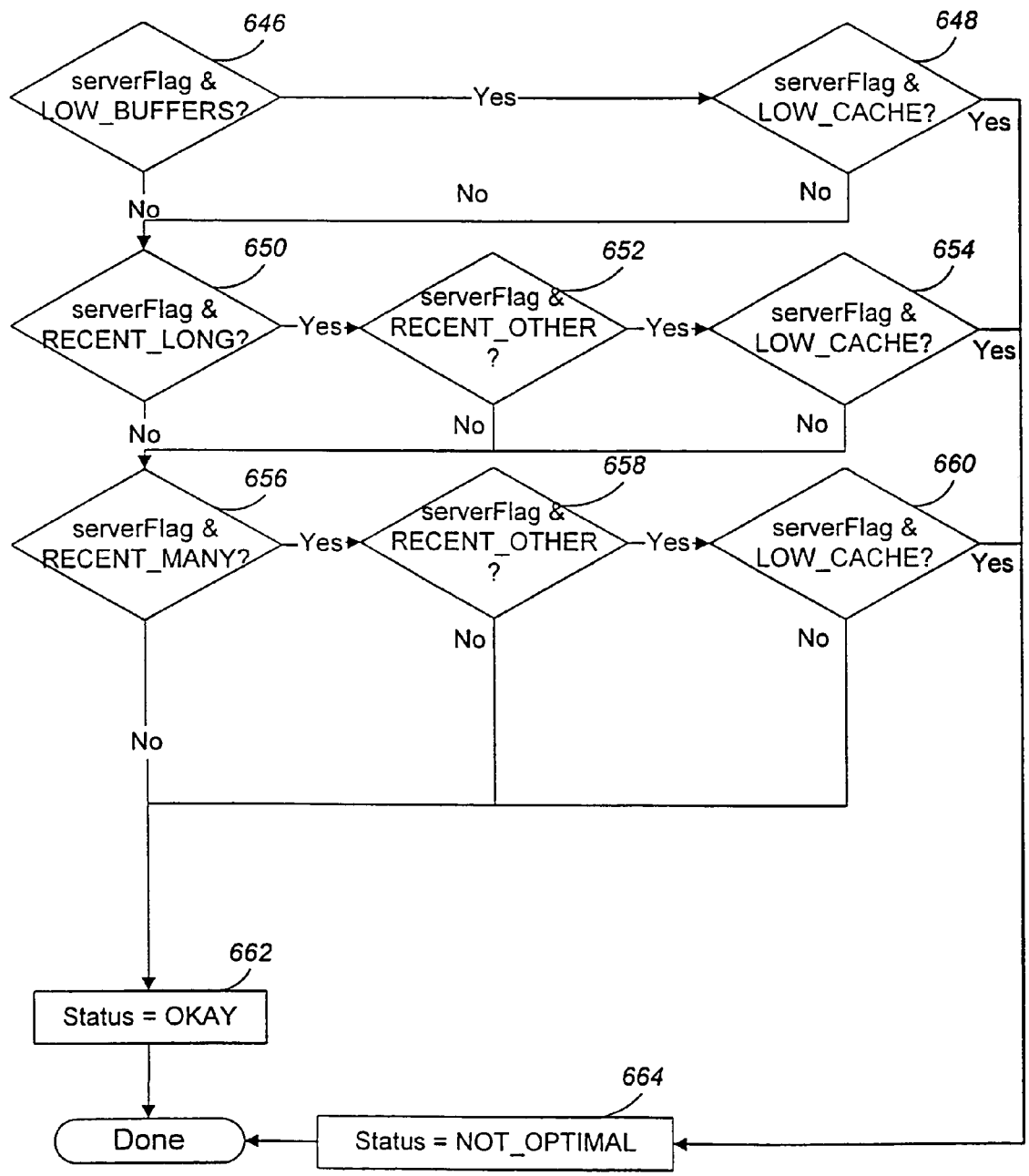

Referring to FIG. 15, a value is assigned to Status in the case of a request for a flow which is non-bursty, frequently requested, and short-lived as follows. Status is assigned a value of NOT_OPTIMAL (step 664) if any of the following conditions obtain: (1) the LOW_BUFFERS and LOW_CACHE flags of serverFlag are set (decision steps 646, 648); (2) the RECENT_LONG, RECENT_OTHER, and LOW_CACHE flags of serverFlag are set (decision steps 650, 652, and 654); or (3) the RECENT_MANY, RECENT_OTHER, and LOW_CACHE flags of serverFlag are set (decision steps 656, 658, and 660). Otherwise, Status is assigned a value of OKAY (step 662).

Figure 16:
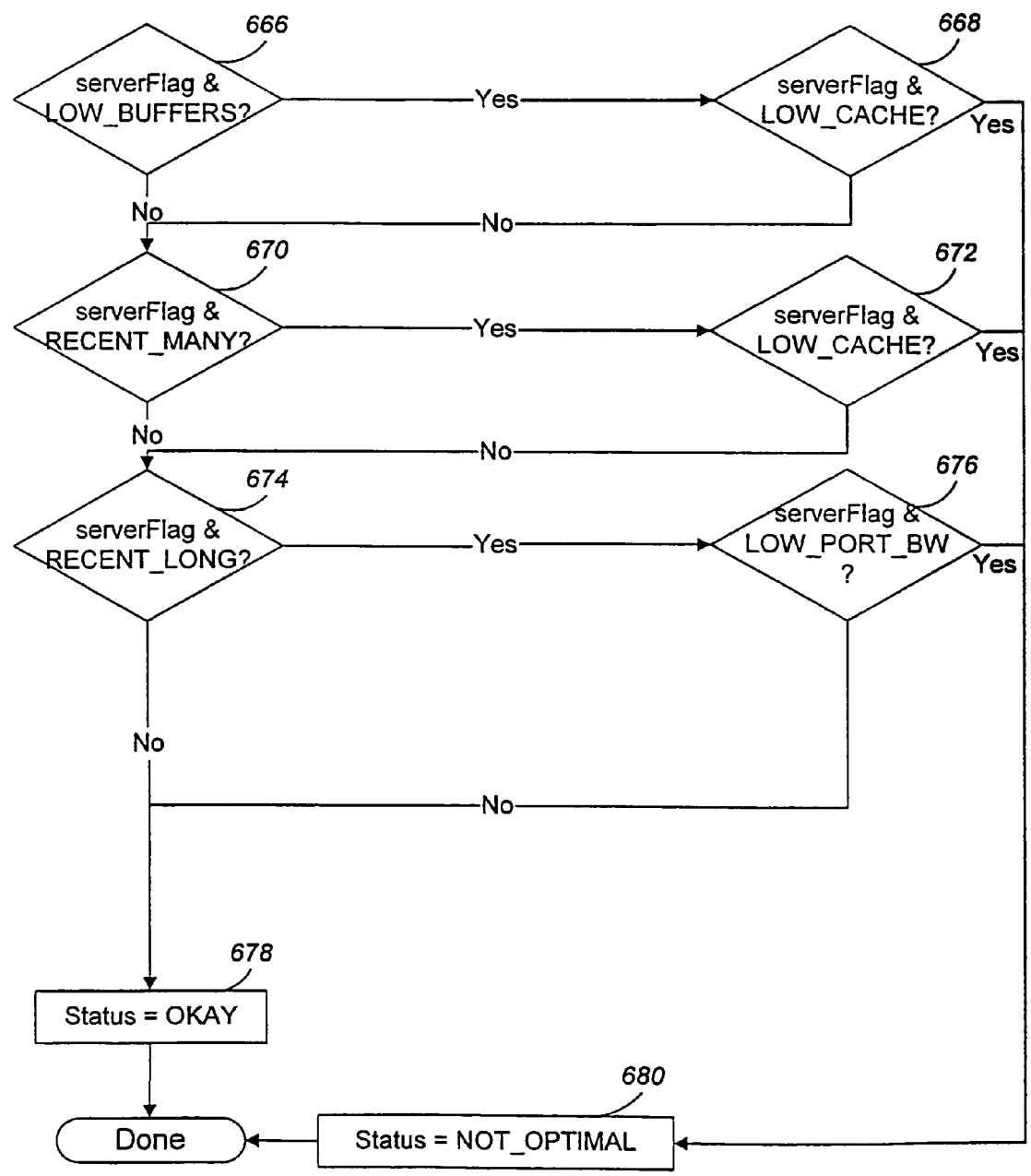

Referring to FIG. 16, a value is assigned to Status in the case of request for flows which are not handled by any of FIGS. 12–15 as follows. Status is assigned a value of NOT_OPTIMAL (step 680) if any of the following conditions obtain: (1) the LOW_BUFFERS and LOW_CACHE flags of serverFlag are set (decision steps 666, 668); (2) the RECENT_MANY and LOW_CACHE flags of serverFlag are set (decision steps 67 and 672); or (3) the RECENT_LONG and LOW_PORT_BW flags of serverFlag are set (decision steps 674 and 676). Otherwise, Status is assigned a value of OKAY (step 678).

Referring again to FIG. 6, the servers remaining in the candidate server list are sorted again, this time by proximity to the client making the content request (step 472). The details of sorting by proximity are discussed in more detail below with respect to the Internet Proximity Assist (IPA) and with respect to FIG. 22.

The first server in the candidate server list is examined, and if it is local to the content-aware flow switch 110 (decision step 474), then a variable Status is assigned a value of ACCEPT (step 478), indicating that the content-aware flow switch 110 can service the requested flow using a local server. Otherwise, Status is assigned a value of REDIRECT (step 476), indicating that the flow request should be redirected to a remote server.

The process of deciding whether to create a flow in response to a client content request is referred to as Flow Admission Control (FAC). Referring again to FIG. 3, if the value of Status is ACCEPT (decision step 406), then the FAC is asked to assign the requested flow to a local server (step 408). The FAC admits flows into the flow switch 110 based on flow QoS requirements and the amount of link bandwidth, flow switch bandwidth, and flow switch buffers. Flow admission control is performed for each content request in order to verify that adequate resources exist to service the content request, and to offer the content request the level of service indicated by its QoS requirements. If sufficient resources are not available, the content request may be redirected to another site capable of servicing the request or simply be rejected.

Figure 17:
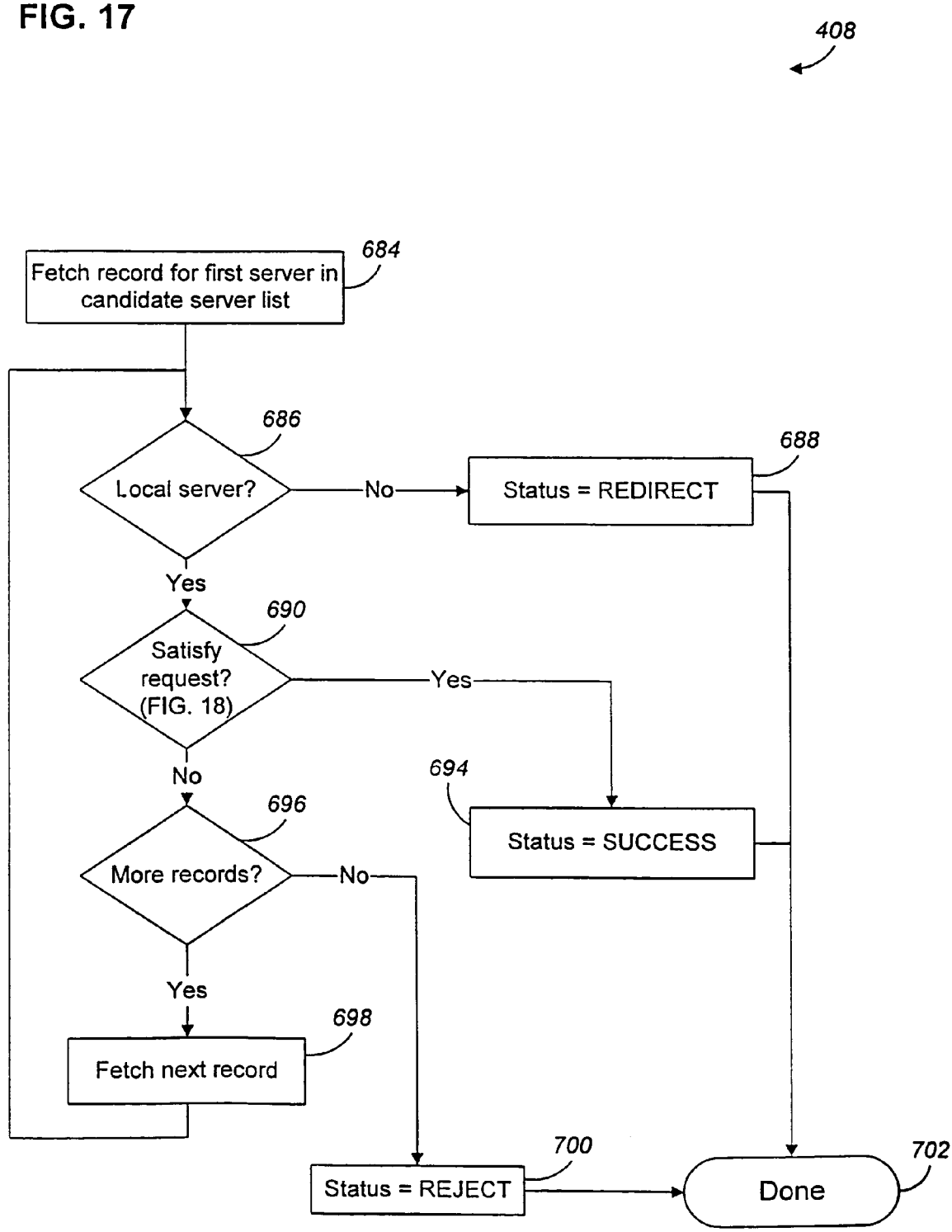
FIG. 17 is a flow chart of a method for assigning a flow to a local server.

More specifically, referring to FIG. 17, the FAC assigns a flow to a local server from among an ordered list of candidate servers, in response to a content request, as follows. First, the FAC fetches the first server record from the list of candidate servers (step 684). If the server record is for a local server (decision step 686), and the local server can satisfy the content request (decision step 690), then the FAC indicates that the content request has been successfully assigned to a local server (step 694). If the server record is not for a local server (decision step 686), then the FAC indicates that the content request should be redirected (step 688).

If the server record is for a local server (decision step 686) that cannot satisfy the content request (decision step 690), and there are more records in the list of candidate servers to evaluate (decision step 696), then the FAC evaluates the next record in the list of candidate servers (step 698) as described above. If all of the records have been evaluated without redirecting the request or assigning the request to a local server, then the content request is rejected, and no flow is set up for the content request (step 700).

Figure 18:
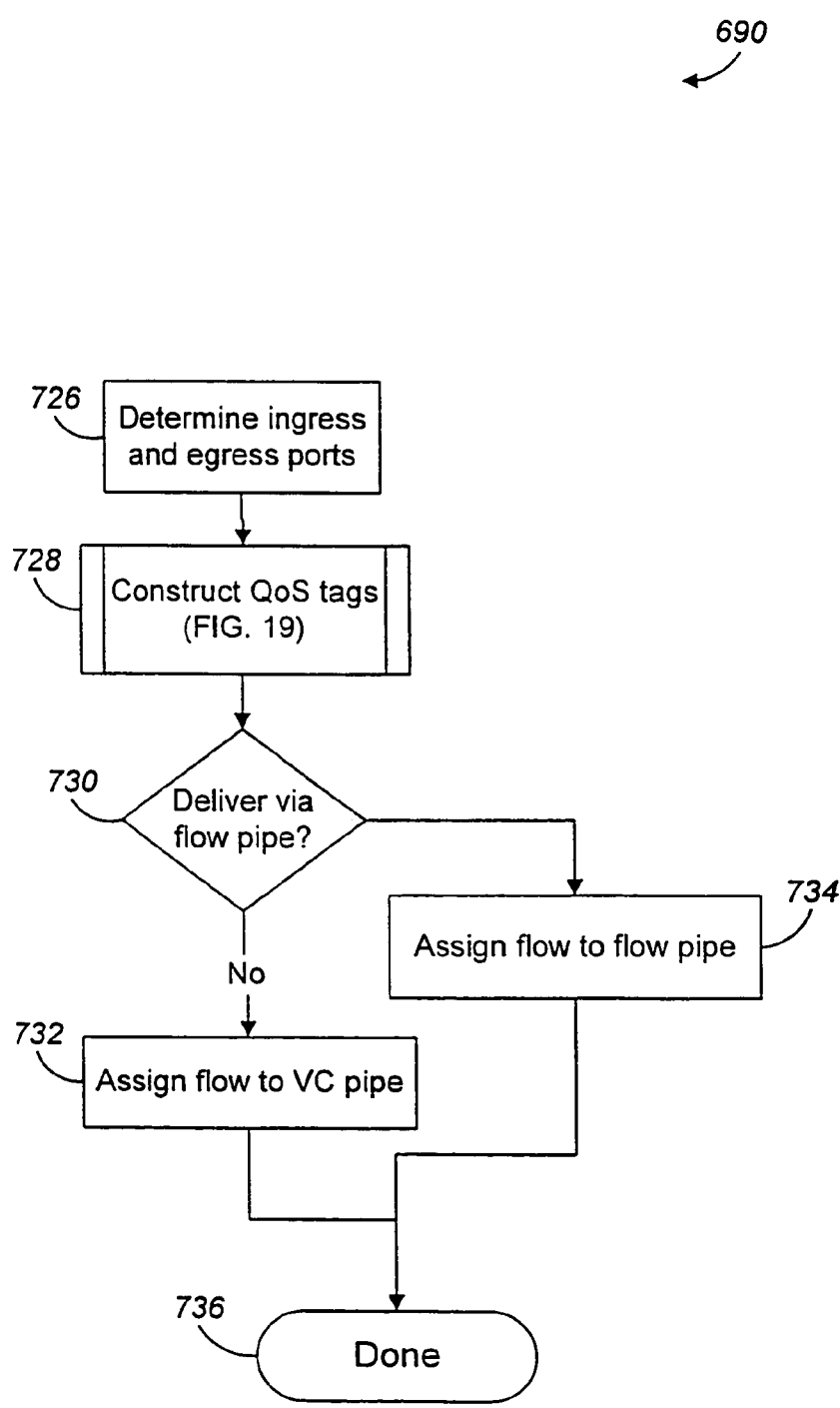
FIG. 18 is a flow chart of a method for attempting to satisfy a request for a flow.

Referring to FIG. 18, the FAC attempts to establish a flow between a client and a candidate server, in response to a client content request, as follows. The FAC extracts, from the CSD server record for the candidate server, the egress port of the flow switch to which the candidate server is connected. The FAC also extracts, from the content request, the ingress port of the flow switch at which the content request arrived (step 726). Using the information obtained in step 726 and other information from the candidate server record, the FAC constructs one or more QoS tags (step 728). A QoS tag encapsulates information about the deduced QoS requirements of an existing or requested flow.

If the requested content is not served by a (physical or virtual) web host associated with a flow pipe (decision step 730), then the FAC attempts to add the requested flow to an existing VC pipe (step 732). A VC pipe is a logical aggregation of flows sharing similar characteristics; more specifically, all of the flows aggregated within a single VC pipe share the same ingress port, egress port, and QoS requirements. Otherwise, the FAC attempts to add the requested flow to the flow pipe associated with the server identified by the candidate server record (step 734). Once the QoS requirements of a flow have been calculated, they are stored in a QoS tag, so that they may be subsequently accessed without needing to be recalculated.

Figure 19:
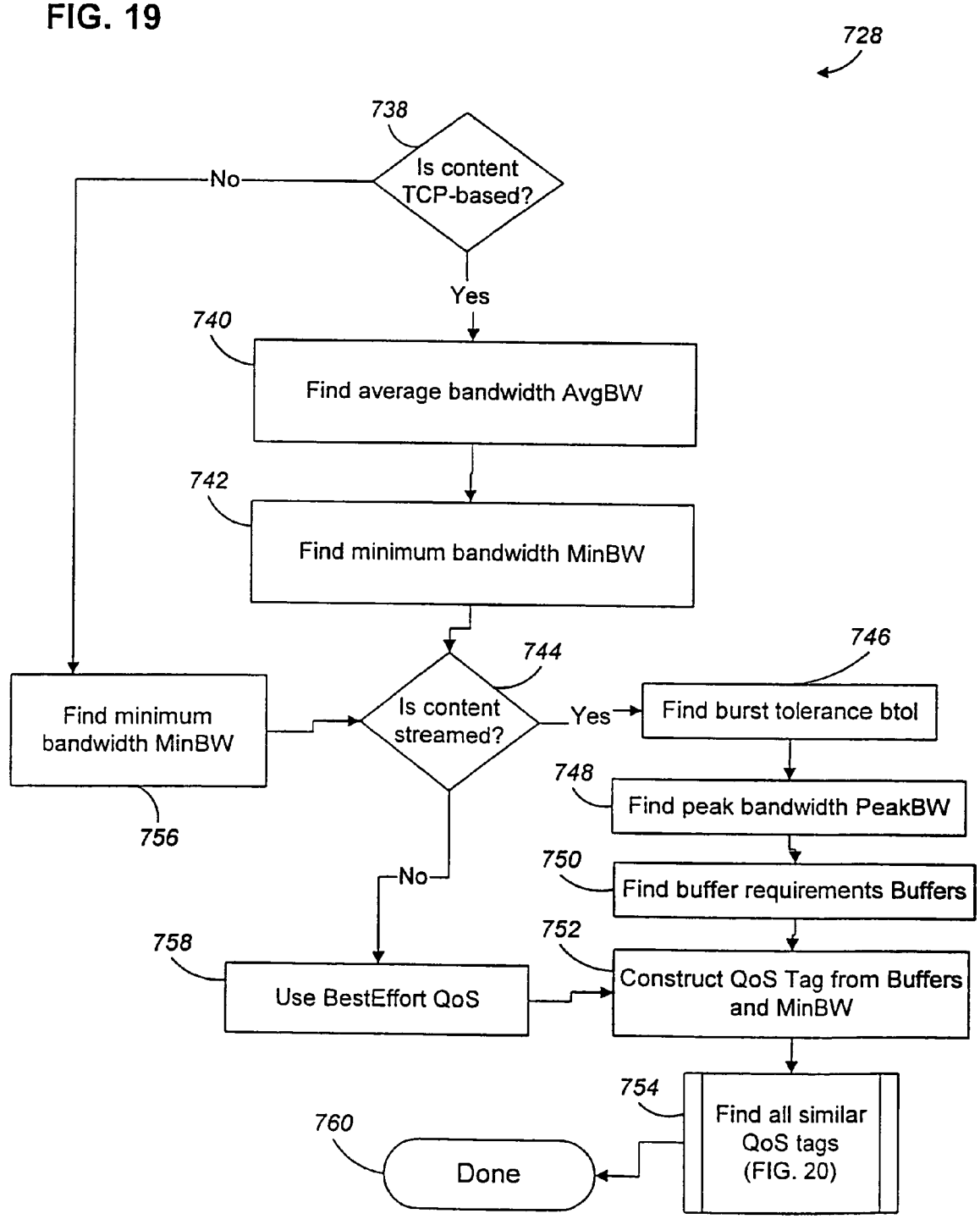
FIG. 19 is a flow chart of a method for constructing a QoS tag.

Referring to FIG. 19, the FAC constructs a QoS tag from a candidate server record, ingress and egress port information, and any available client information, as follows. If the requested content is not to be delivered using TCP (decision step 738), then the FAC calculates the minimum bandwidth requirement MinBW of the requested content based on the total bandwidth PortBW available to he logical egress port of the flow and the hop latency hopLatency (a static value contained in the candidate server record) of the flow, using the formula:

$$MinBW = frameSize/hopLatency)  \quad \text{Formula 1}$$

(step 756). If the requested content is to be delivered using TCP (decision step 738), then the FAC calculates the average bandwidth requirement AvgBW of the requested flow based on the size of the candidate server's cache CacheSize (contained in the candidate server record), the TCP window size TcpW (contained in the content request), and the round trip time RTT (determined during the initial flow handshake), using the formula:

$$AvgBW=min(CacheSize, TcpW)/RTT \quad \text{Formula 2}$$

(step 740). The FAC uses the average bandwidth AvgBW and the flow switch latency (a constant) to determine the minimum bandwidth requirement MinBW of the requested content using the formula:

$$MinBW=min(AvgBW*MinToAvg, clientBW) \quad \text{Formula 3}$$

In Formula 3, MinToAvg is the flow switch latency and clientBW is derived from the maximum segment size (MSS) option of the flow request (step 742).

The content-aware flow switch 110 reserves a fixed amount of buffer space for flows. The FAC is responsible for calculating the buffer requirements (stored in the variable Buffers) of both TCP and non-TCP flows, as follows. If the requested flow is not to be streamed (decision step 744), then the flow is provided with a best-effort level of buffers (step 758). Streaming is typically used to deliver real-time audio or video, where a minimum amount of information must be delivered per unit of time. If the content is to be streamed (decision step 744), then the burst tolerance btol of the flow is calculated (step 746), the peak bandwidth of the flow is calculated (step 748), and the buffer requirements of the flow are calculated (step 750). A QoS tag is constructed containing information derived from the calculated minimum bandwidth requirement and buffer requirements (step 752). The FAC searches for any other similar existing QoS tags that sufficiently describe the QoS requirements of the requested content (step 754).

Figure 20:
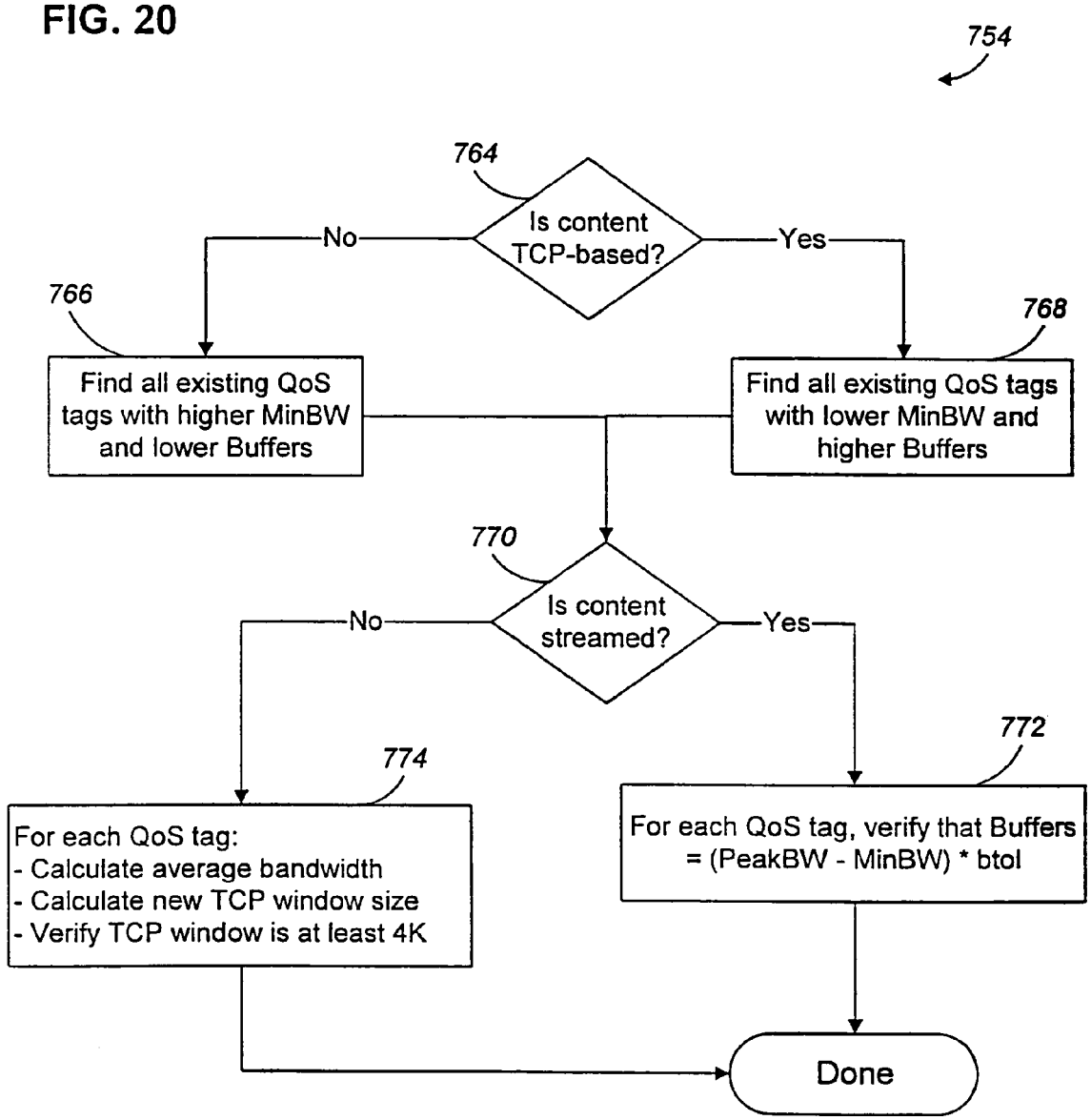
FIG. 20 is a flow chart of a method for locating QoS tags which are similar to a given QoS tag.

Referring to FIG. 20, the FAC locates any existing QoS tags which are similar enough (in MinBW and Buffers) to the QoS tag constructed in FIG. 19 to be acceptable for this content request, as follows. If the requested content is not to be delivered via TCP (decision step 764), then the FAC finds all QoS tags with a higher minimum bandwidth requirement but with lower buffer requirements than the given QoS tag (step 766). If the content is to be delivered via TCP (decision step 764), then the FAC finds all QoS tags with a lower minimum bandwidth requirement and higher buffer requirements than the given QoS tag (step 768). If the requested content is not to be streamed (decision step 770), then for each existing QoS tag, the FAC calculates the average bandwidth, calculates the TCP window size as TcpW=AvgBW*RTT, and verifies that the TCP window size is at least 4K (the minimum requirement for HTTP transfers) (step 774). If the requested content is to be streamed (decision step 770), then the FAC examines each existing QoS tag and excludes those that are not capable of delivering the required peak bandwidth PeakBW or burst tolerance btol, as calculated in FIG. 19, steps 746 and 748 (step 772). The resulting list of QoS tags is then used when aggregating the flow into a VC-pipe or flow pipe.

One of the effects of the procedures shown in FIGS. 3–20 is that the flow switch 110 functions as a network address translation device. In this role, it receives TCP session setup requests from clients, terminates those requests on behalf of the servers, and initiates (or reuses) TCP connections to the best-fit target server on the client's behalf. For that reason, two separate TCP sessions exist, one between the client and the flow switch, the other between the flow switch and the best-fit server. As such, the IP, TCP, and possible content headers on packets moving bidirectionally between the client and server are modified as necessary as they traverse the content-aware flow switch 110.

Flow Pipes

A content-aware flow switch can be used to front-end many web servers. For example, referring to FIG. 1c, the flow switch 110 front-ends web servers 100a–c. Each of the physical web servers 100a–c may embody one or more virtual web hosts (VWH's). Associated with each of the VWH's front-ended by the flow switch 110 may be a "flow pipe," which is a logical aggregation of the VWH's flows. Flow pipes guarantee an individual VWH a configurable amount of bandwidth through the content-aware flow switch 110.

Figure 21A:
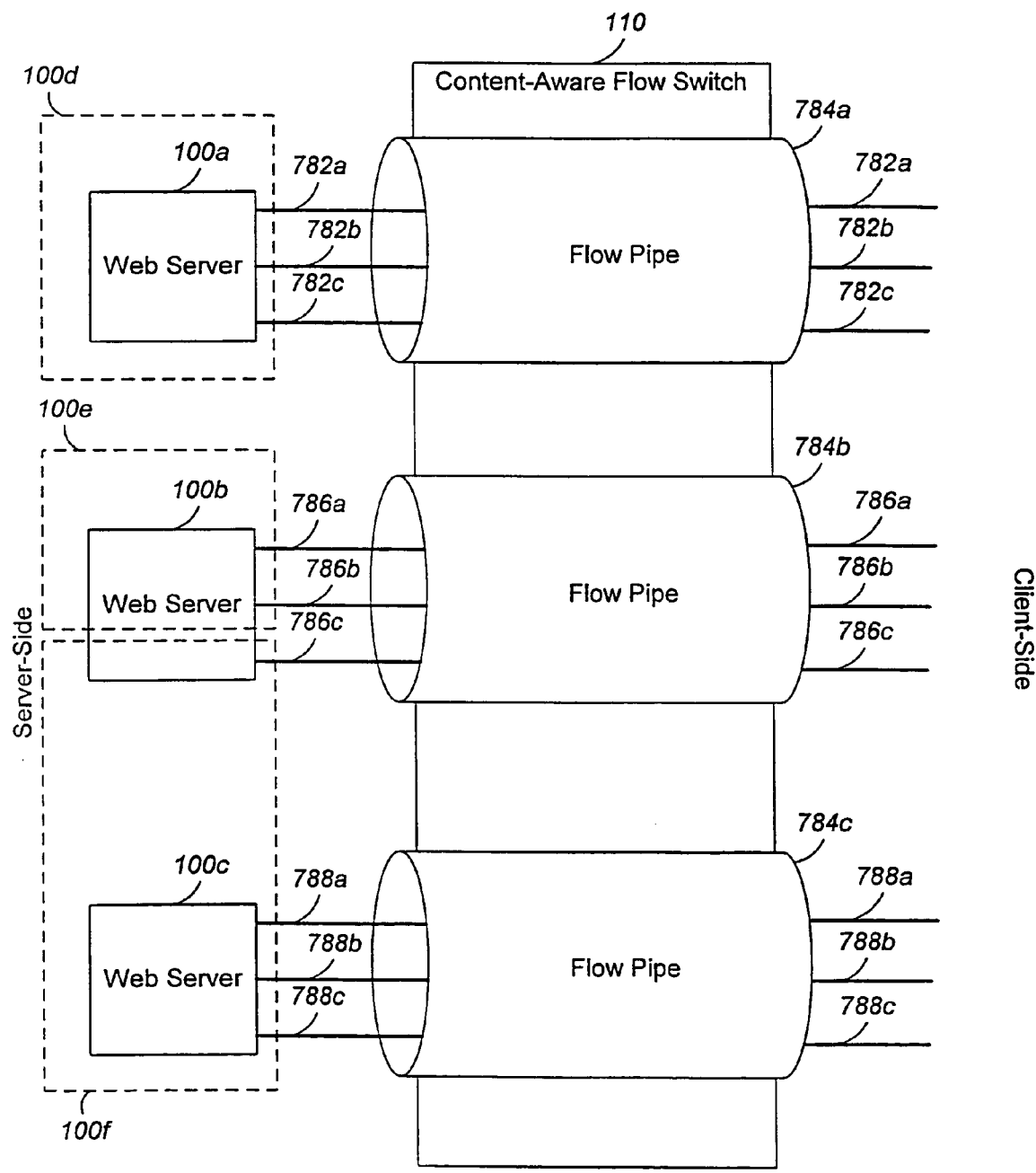
FIGS. 21a–b are block diagrams of flow pipe traffic through a content-aware flow switch.

Referring to FIG. 21a, web servers 100a–c provide service to VWHs 100d–f as follows. Web server 100a provides all services to VWH 100d. Web server 100b provides service to VWH 100e and a portion of the services to VWH 100f. Web server 100c provides service to the remainder of VWH 100f. Associated with VWHs 100d–f are flow pipes 784a, 784b, and 784c, respectively. Note that flow pipes 784a–c are logical entities and are therefore not shown in FIG. 21a as connecting to VWH's 100d–f or the flow switch 110 at physical ports.

The properties of each of the VWH's 100d–f is configured by the system administrator. For example, each of the VWH's 100d–f has a bandwidth reservation. The flow switch 110 uses the bandwidth reservation of a VWH to determine the bandwidth to be reserved for the flow pipe associated with the VWH. The total bandwidth reserved by the flow switch 110 for use by flow pipes, referred to as the flow pipe bandwidth, is the sum of all the individual flow pipe reservations. The flow switch 110 allocates the flow pipe bandwidth and shares it among the individual flow pipes 784a–c using a weighted round robin scheduling algorithm in which the weight assigned to an individual flow pipe is a percentage of the overall bandwidth available to clients. The flow switch 110 guarantees that the average total bandwidth actually available to the flow pipe at any given time is not less than the bandwidth configured for the flow pipe regardless of the other activity in the flow switch 110 at the time. Individual flows within a flow pipe are separately weighted based on their QoS requirements. The flow switch 110 maintains this bandwidth guarantee by proportionally adjusting the weights of the individual flows in the flow pipe so that the sum of the weights remains constant.

By policing against over-allocation of bandwidth to a particular VWH, fairness can be achieved among the VWH's competing for outbound bandwidth through the flow switch 110.

Again referring to FIG. 21a, consider the case in which the flow switch 110 is configured to provide service to three VWH's 100d–f. Suppose that the bandwidth requirements of VWH 100d–f are 64 Kbps, 256 Kbps, and 1.5 Mbps, respectively. The total flow pipe bandwidth reserved by the flow switch 110 is therefore 1.82 Mbps. Assume for purposes of this example that the flow switch 110 is connected to the Internet by uplinks 115a–c with bandwidths of 45 Mbps, 1.5 Mbps, and 1.5 Mbps, respectively, providing a total of 48 Mbps of bandwidth to clients. In this example, flow pipe 784a is assigned a weight of 0.0013 (64 Kbps/48 Mbps), flow pipe 784b is assigned a weight of 0.0053 (256 Kbps/48 Mbps), and flow pipe 784c is assigned a weight of 0.0312 (1.5 Mbps/48 Mbps). As individual flows within flow pipes 784a–c are created and destroyed, the weights of the individual flows are adjusted such that the total weight of the flow pipe is held constant.

Figure 21B:
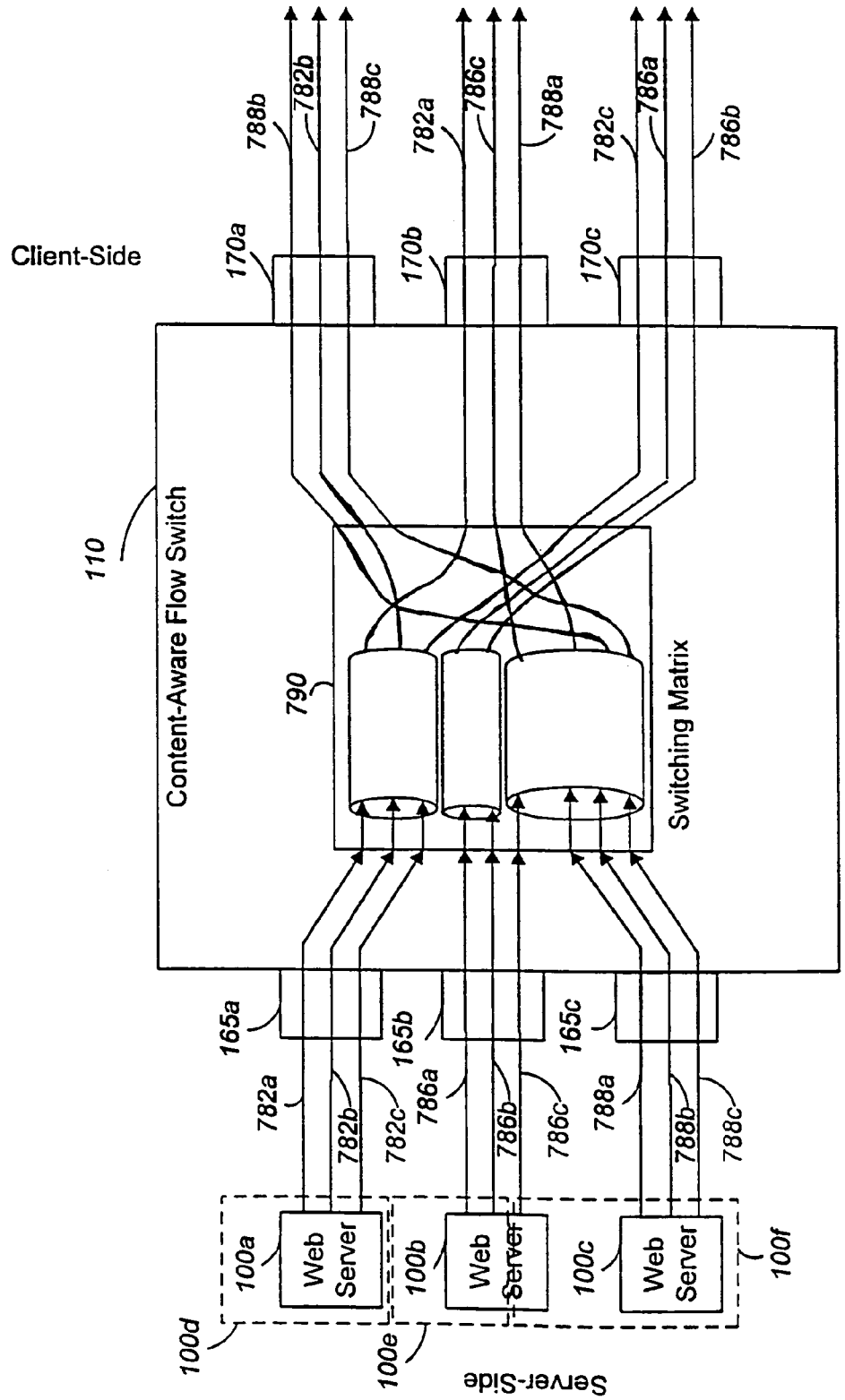

The relationship between flows, flow pipes, and the physical ingress ports 170a–c and physical egress ports 165a–c of the content-aware flow switch 110 is discussed below in connection with FIG. 21b. Flows 782a–c from VWH 100d enter the flow switch at egress port 165a. Flows 786a-b from VWH 100e enter the flow switch at egress port 165b. Flow 786c from VWH 100f enters the flow switch at egress port 165b. Flows 788a–c from VWH 100f enters the flow switch from egress port 165c. After entering the flow switch 110, the flows 782a–c, 786a–c, and 788a–c are managed within their respective flow pipes 784a–c as they pass through the switching matrix 790. The switching matrix is a logical entity that associates a logical ingress port and a logical egress port with each of the flows 782a–c, 786a–c, and 788a–c. As previously mentioned, each of the physical ingress ports 170a–c may act as one or more logical ingress ports, and each of the physical egress ports 165a–c may act as one or more logical egress ports. FIG. 21b shows a possible set of associations of physical ingress ports with flow pipes and physical egress ports for the flows 782a–c, 786a–c, and 788a–c.

Internet Proximity Assist

A client may request content that is available from several candidate servers. In such a case, the Internet Proximity Assist (IPA) module of the content-aware flow switch 110 assigns a preference to servers which are determined to be "closest" to the client, as follows.

The Internet is composed of a number of independent Autonomous Systems (AS's). An Autonomous System is a collection of networks under a single administrative authority, typically an Internet Service Provider (ISP). The ISPs are organized into a loose hierarchy. A small number of "backbone" ISPs exist at the top of the hierarchy. Multiple AS's may be assigned to each backbone service provider. Backbone service providers exchange network traffic at Network Access Points (NAPs). Therefore, network congestion is more likely to occur when a data stream must pass through one or more NAPs from the client to the server. The IPA module of the content-aware flow switch 110 attempts to decrease the number of NAPs between a client and a server by making an appropriate choice of server.

The IPA uses a continental proximity lookup table which associates IP addresses with continents as follows. Most IP address ranges are allocated to continental registries. The registries, in turn, allocate each of the address ranges to entities within a particular continent. The continental proximity lookup table may be implemented using a Patricia tree which is built based on the IP address ranges that have been allocated to various continental registries. The tree can then be searched using the well-known Patricia search algorithm. An IP address is used as a search key. The search results in a continent code, which is an integer value that represents the continent to which the address is registered. Given the current allocations of IP addresses, the possible return values are shown in Table 2.

TABLE 2

| ID | Continent |
|----|-----------|
| 0 | Unknown |
| 1 | Europe |
| 2 | North America |
| 3 | Central and South America |
| 4 | Pacific Rim |

Additional return values can be added as IP addresses are allocated to new continental registries. Given the current allocation of addresses, the continental proximity table used by the IPA is shown in Table 3.

TABLE 3

| IP ADDRESS RANGE | CONTINENT IDENTIFIER |
|---|---|
| 0.0.0.0 through 192.255.255.255 | 0 (Unknown) |
| 193.0.0.0 through 195.255.255.255 | 1 (Europe) |
| 196.0.0.0 through 197.255.255.255 | 0 (Unknown) |
| 198.0.0.0 through 199.255.255.255 | 2 (North America) |
| 200.0.0.0 through 201.255.255.255 | 3 (Central and South America) |
| 202.0.0.0 through 203.255.255.255 | 4 (Pacific Rim) |
| 204.0.0.0 through 209.255.255.255 | 2 (North America) |
| 210.0.0.0 through 211.255.255.255 | 4 (Pacific Rim) |
| 212.0.0.0 through 223.255.255.255 | 0 (Unknown) |

Referring to FIG. 22, the IPA assigns proximity preferences to zero or more servers, from a list of candidate servers and a client content request, as follows. The IPA identifies the continental location of the client (step 800). If the client continent is not known (decision step 801), then control passes to step 812, described below. Otherwise, the IPA identifies the continental location of each of the candidate servers (step 802) using the continental proximity lookup table, described above. If all of the server continents are unknown (decision step 803), control passes to step 807, described below. Otherwise, if none of the candidate servers are in the same continent as the client (decision step 804), then the IPA does not assign a proximity preference to any of the candidate servers (step 806).

At step 807, the IPA prunes the list of candidate servers to those which are either unknown or in the same continent as the client. If there is exactly one server in the same continent as the client (decision step 808), then the server in the same continent as the client is assigned a proximity preference (decision step 810). For purposes of decision steps 804 and 808, a client and a server are considered to reside in the same continent if their lookup results match and the matching value is not 0 (unknown).

If there is more than one server in the same continent as the client (decision step 808), then the IPA assigns a proximity preference to one or more servers, if any, which share a "closest" backbone ISP with the client, where "closest" means that the backbone ISP can reach the client without going through another backbone ISP. A closest-backbone lookup table, which may be implemented using a Patricia tree, stores information about which backbone AS's are closest to each range of IP addresses. An IP address is used as the key for a search in the closest-backbone lookup table. The result of a search is a possibly empty list of AS's which are closest to the IP address used as a search key.

The IPA performs a query on the closest-backbone lookup table using the client's IP address to obtain a possibly empty list of the AS's that are closest to the client (step 812). The IPA queries the closest-backbone lookup table to obtain the AS's which are closest to each of the candidate servers previously identified as being in the same continent as the client (step 814). The IPA then identifies all candidate servers whose query results contain an AS that belongs to the same ISP as any AS resulting from the client query performed in step 812 (step 816). Each of the servers identified in step 816 is then assigned a proximity preference (step 818).

After any proximity preferences have been assigned in either step 810 or 818, the existence of a network path between the client and each of the preferred servers is verified (step 820). To verify the existence of a network path between the client and a server, the content-aware flow switch 110 queries the content-aware flow switch that front-ends the server. The remote content-aware flow switch either does a Border Gateway Protocol (BGP) route table lookup or performs a connectivity test, such as by sending a PING packet to the client, to determine whether a network path exists between the client and the server. The remote content-aware flow switch then sends a message to the content-aware flow switch 110 indicating whether such a path exists. Any server for which the existence of a network path cannot be verified is not assigned a proximity preference. Servers to which a proximity preference has been assigned are moved to the top of the candidate server list (step 822).

Because multiple AS's may be assigned to a single ISP, an ISP-AS lookup table is used to perform step 816. The ISP-AS lookup table is an array in which each element associates an AS with an ISP. An AS is used as a key to query the table, and the result of a query is the ISP to which the key AS is assigned.

Figure 23:
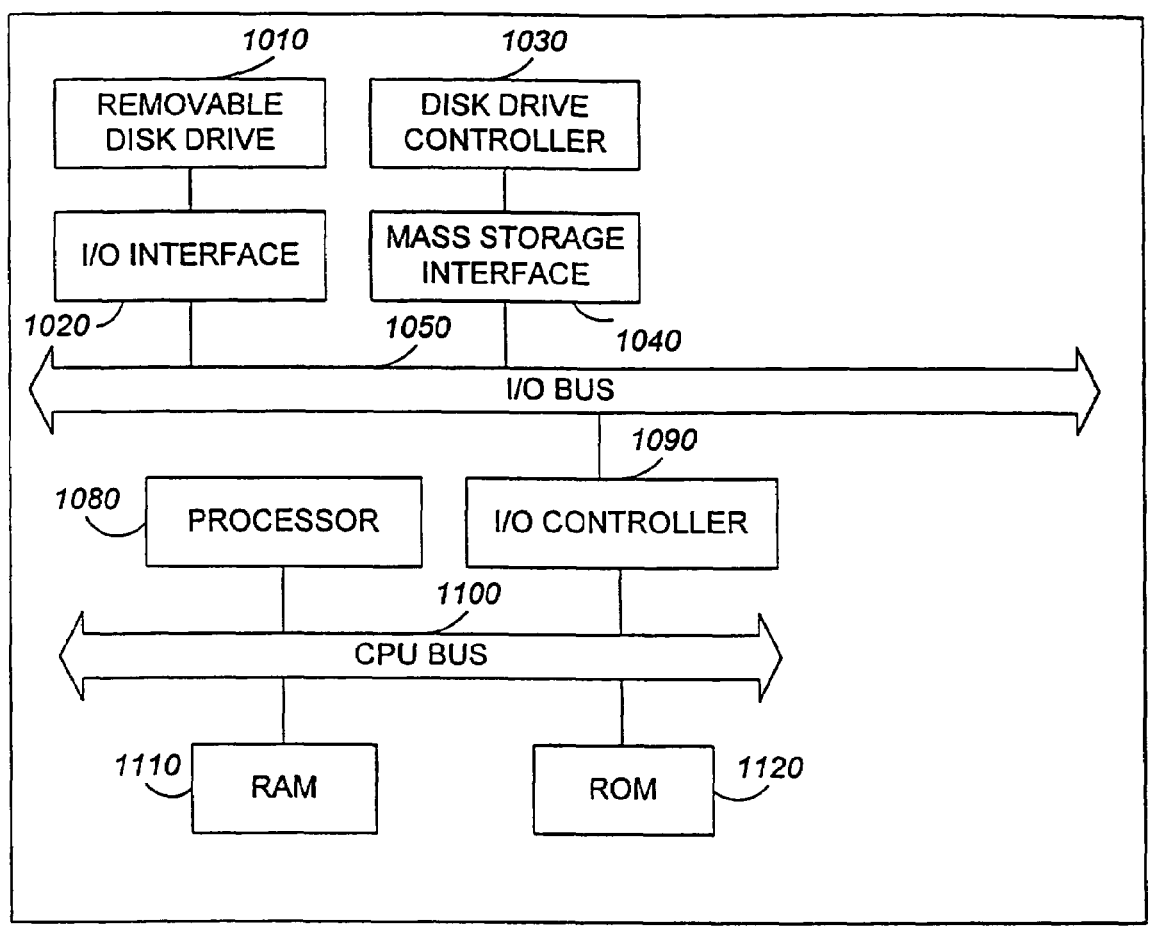
FIG. 23 is a block diagram of a computer and computer elements suitable for implementing elements of the invention.

Referring to FIG. 23, the invention may be implemented in digital electronic circuitry or in computer hardware, firmware, software, or in combinations of them. Apparatus of the invention may be implemented in a computer program product tangibly embodied in a machine-readable storage device for execution by a computer processor 1080; and method steps of the invention may be performed by a computer processor 1080 executing a program to perform functions of the invention by operating on input data and generating output. The processor 1080 receives instructions and data from a read-only memory (ROM) 1120 and/or a random access memory (RAM) 1110 through a CPU bus 1100. The processor 1080 can also receive programs and data from a storage medium such as an internal disk 1030 operating through a mass storage interface 1040 or a removable disk 1010 operating through an I/O interface 1020. The flow of data over an I/O bus 1050 to and from I/O devices and the processor 1080 and memory 1110, 1120 is controlled by an I/O controller 1090.

The present invention has been described in terms of an embodiment. The invention, however, is not limited to the embodiment depicted and described. Rather, the scope of the invention is defined by the claims.

What is claimed is:

1. A content aware flow switch interconnecting a plurality of web servers and at least one client side device, comprising:
   a client side interface operable to connect a plurality of client computing devices for receiving client requests for content and delivering network services in the form of media content responsive to the client requests;
   a content server database operable to store server metrics and content switching criteria, and further operable to derive content information from the client request, the content information indicative of criteria for processing the client request
   a flow admission controller for identifying, from among a plurality of servers, a set of potential servers adapted to service the client request, the set of potential servers each having a plurality of server metrics indicative of server resources; and
   a web flow redirector operable to compute, based on analyzing the derived content information and the content switching criteria, a best-fit server from the set of potential servers, the best fit server having a high correspondence between the plurality of server metrics and the criteria for processing the client request.

2. The flow switch of claim 1 wherein the web flow redirector is further operable to assign packets responsive to the client request based on a high correspondence between the plurality of server metrics and the criteria for processing the client request.

3. The flow switch of claim 2 wherein the web flow redirector is operable to assign packets corresponding to a particular criteria to at least on of a flow pipe and a virtual connection VC pipe.

4. The flow switch of claim 3 wherein the assigned packets are forwarded on a forwarding path based on flow content information derived from source address, destination address, transport layer protocol, port number QOS designation.

5. The flow switch of claim 4 wherein the packets corresponding to a particular client request are packet flows, the packet flows assigned to VC pipes based on matching characteristics in the content information of respective flows through the VC pipe.

6. A web server responsive to a content aware flow switch for delivering network content responsive to client requests comprising:
   an interface to a content aware flow switch for receiving a client request for network services, the client request for at least one of a particular type of content; and
   a content resource, the content resource responsive to derived content information from the client request, the content information indicative of criteria for processing the client request, the interface invokable by the content aware flow switch based on identifying, from among a plurality of servers, a set of potential servers adapted to service the client request, the set of potential servers each having a plurality of server metrics indicative of server resources, the content aware flow switch further operable to compute, based on analyzing the derived content information and the content switching criteria, a best-fit server from the set of potential servers, the best fit server having a high correspondence between the plurality of server metrics and the criteria for processing the client request.

7. The web server of claim 6 wherein the web server is operable to selectively apportion the data flow for response traffic emanating from the web server, the data traffic responsive to client requests and directed to an end user.

8. The web server of claim 7 wherein the web server is responsive to the content aware flow switch for determining whether to admit a flow to the flow switch.

9. The web server of claim 8 wherein the content aware flow switch is operable to compute the derived content information based on transport and session level routing information derived from data traffic packets.

10. The web server of claim 9 wherein the content aware flow switch is operable to Identify a sticky server and reassign flow traffic accordingly, a sticky server being sensitive to a packet context such that subsequent packets expect the same server as previous packets.

11. In a computer network operable for providing network services, a client side router coupled to end station computing devices operable to serve a plurality of end user comprising:
an interface to a content aware flow switch operable as a front end to a plurality of web servers; and
an interface to at least one user operable to receive a client request for network services, the client request for at least one of a particular type of content, the client request having derivable content information indicative of content switching criteria for processing the client request, the client side router responsive to the content aware flow switch for identifying, from among a plurality of servers, a set of potential servers adapted to service the client request, the set of potential servers each having a plurality of server metrics indicative of server resources, the content aware flow switch further operable to compute, based on analyzing the derived content information and the content switching criteria, a best-fit server from the set of potential servers, the best fit server having a high correspondence between the plurality of server metrics and the criteria for processing the client request.

12. The router of claim 11 wherein the router is operable to route assigned packets to a packet flow based on a high correspondence between the plurality of server metrics and the content switching criteria for processing the client request, the packets assigned by the content aware flow switch.

13. The router of claim 12 wherein the content aware flow switch is operable to assign packets corresponding to a particular criteria to at least on of a flow pipe and a virtual connection VC pipe.

14. The router of claim 13 wherein the assigned packets are forwarded on a forwarding path based on flow content information derived from source address, destination address, transport layer protocol, port number QOS designation.

15. The router of claim 14 wherein the packet flows are packets corresponding to a particular request, the packet flows being assigned to VC pipes based on matching characteristics in the content information of respective flows through the VC pipe.

16. In a network data communications device, a method for identifying a server to service a network request comprising:
receiving a client request for network services, the client request for at least one of a particular type of content;
deriving content information from the client request, the content information indicative of content switching criteria for processing the client request;
identifying, from among a plurality of servers, a set of potential servers adapted to service the client request, the set of potential servers each having a plurality of server metrics indicative of server resources;
computing, based on analyzing the derived content information and the content switching criteria, a best-fit server from the set of potential servers, the best fit server having a high correspondence between the plurality of server metrics and the criteria for processing the client request;
selecting at least one of one of a flow pipe and a virtual connection VC pipe for a particular packet; and
assigning packets corresponding to a particular criteria to a packet flow based on a high correspondence between the plurality of server metrics and the content switching criteria, the packets assigned by the content aware flow switch, the assigning to a packet flow further comprising:
selectively apportioning the data flow for response traffic, the response traffic emanating from a web server and directed to an end user responsive to a client request;
determining whether to admit a flow to a particular flow via the flow switch based on flow content information based on transport and session level routing information derived from data traffic packets; and
forwarding assigned packets on a forwarding path based on flow content information derived from source address, destination address, transport layer protocol, port number QOS designation, the packets corresponding to a particular request further comprising a packet flow, the packet flows being assigned to VC pipes based on matching characteristics in the content information of respective flows through the VC pipe.

17. The method of claim 16 further comprising identifying a sticky server and reassigning flow traffic accordingly to avoid context loss, a sticky server being sensitive to a packet context such that subsequent packets expect the same server as previous packets.

18. The method of claim 17 wherein assigning packets further comprises establishing a flow between the client originating the client request and the computed best-fit server, the flow established by a flow admission controller module by:
assigning, if an existing VC pipe shares similar characteristics with the established flow, the established flow to the existing VC pipe; and
creating, if an existing VC pipe has insufficient resources to handle the established flow, a new VC pipe for the established flow.

19. The method of claim 18 wherein identifying the set of potential servers and computing the best fit server is performed in a continuous non-blocking manner independent of external inputs.

20. The method of claim 19 wherein computing based on the content switching criteria further comprises querying content rules, content records, and server records, the content rules indicative of flow switch operation, the content records derived from the content rules, and the server records indicative of processing resources at a particular server.

* * * * *